US012640878B2

(12) United States Patent
Ly et al.

(10) Patent No.: US 12,640,878 B2
(45) Date of Patent: *May 26, 2026

(54) PUSCH DMRS BUNDLING INDICATION FOR DIFFERENT TRANSPORT BLOCKS

(71) Applicant: QUALCOMM Incorporated, San Diego, CA (US)

(72) Inventors: Hung Dinh Ly, San Diego, CA (US); Kexin Xiao, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 425 days.

This patent is subject to a terminal disclaimer.

(21) Appl. No.: 18/253,750

(22) PCT Filed: Jan. 13, 2022

(86) PCT No.: PCT/CN2022/071786
§ 371 (c)(1),
(2) Date: May 19, 2023

(87) PCT Pub. No.: WO2022/152207
PCT Pub. Date: Jul. 21, 2022

(65) Prior Publication Data
US 2024/0007247 A1     Jan. 4, 2024

Related U.S. Application Data

(60) Provisional application No. 63/137,682, filed on Jan. 14, 2021.

(51) Int. Cl.
*H04L 5/00*          (2006.01)
*H04W 72/1268*     (2023.01)
*H04W 72/232*       (2023.01)

(52) U.S. Cl.
CPC ....... *H04L 5/0051* (2013.01); *H04W 72/1268* (2013.01); *H04W 72/232* (2023.01)

(58) Field of Classification Search
CPC ... H04L 5/0051; H04L 5/0007; H04L 5/0044; H04L 5/0094; H04W 72/1268; H04W 72/232
See application file for complete search history.

(56) References Cited

U.S. PATENT DOCUMENTS 10,999,030 B2     5/2021   Manolakos et al.
11,737,059 B2     8/2023   Soriaga et al.
                  (Continued)

FOREIGN PATENT DOCUMENTS

CN          111919415 A        11/2020
WO       2017133709 A1          8/2017
                  (Continued)

OTHER PUBLICATIONS

International Search Report and Written Opinion—PCT/CN2022/071786—ISA/EPO—Apr. 1, 2022.
VIVO: "Views on WID Scope for Rel-17 Coverage Enhancements", 3GPP TSG-RAN Meeting #90-e, RP-202638, Electronic Meeting, Dec. 7, 2020-Dec. 11, 2020, 5 Pages, Dec. 11, 2020 (Dec. 11, 2020), sections 2-3.
Guo Z., et al., "5G NR Uplink Coverage Enhancement Based on DMRS Bundling and Multi-slot Transmission", 2020 IEEE 20th International Conference on Communication Technology, Oct. 28, 2020, pp. 482-486, XP055779841, Section IV.
                  (Continued)

*Primary Examiner* — Kiet Tang
(74) *Attorney, Agent, or Firm* — QUALCOMM Incorporated

(57)          ABSTRACT

Aspects are provided that allow a UE to perform DMRS bundling in different transport blocks of uplink data on PUSCH in response to a configuration from a base station indicating or enabling the UE to perform the DMRS bundling. The UE receives a configuration from a base station indicating to bundle DMRS in different uplink data channel transmissions for joint channel estimation. The UE determines a DMRS bundling window based on the configuration. The UE transmits the bundled DMRS in the DMRS bundling window. The base station performs the joint channel estimation based on the bundled DMRS. Improved link quality between the UE and base station and signal gains (Continued)

may accordingly result from applying DMRS bundling over different PUSCH transmissions.

30 Claims, 13 Drawing Sheets

(56) References Cited

U.S. PATENT DOCUMENTS

| | | | |
|---|---|---|---|
| 2019/0222380 A1* | 7/2019 | Manolakos | H04L 25/0224 |
| 2020/0389283 A1 | 12/2020 | Manolakos et al. | |
| 2023/0291523 A1* | 9/2023 | Hasegawa | H04W 52/281 |
| 2023/0421327 A1 | 12/2023 | Ly | |

FOREIGN PATENT DOCUMENTS

| | | |
|---|---|---|
| WO | 2019140342 | 7/2019 |
| WO | 2019147830 | 8/2019 |
| WO | 2019204498 | 10/2019 |

OTHER PUBLICATIONS

Huawei., et al., "Remaining Issues on Resource Allocation and TBS", 3GPP TSG RAN WG1 Meeting #93, R1-1805893, Busan, Korea, May 21-25, 2018, 12 Pages, May 20, 2018, XP051441112, Section 5, Par. 2, p. 12, Section 6.1.2.1.1, Par. 1-3, Table 6.1.2.1.1-1 on p. 13.

Supplementary European Search Report—EP22739083—Search Authority—The Hague—Nov. 4, 2024.

Guo Z., et al., "5G NR Uplink Coverage Enhancement Based on DMRS Bundling and Multi-slot Transmission", 2020 IEEE 20th International Conference on Communication Technology, Dec. 24, 2020, pp. 482-486.

VIVO: "Views on WID Scope for Rel-17 Coverage Enhancements", 3GPP TSG-RAN Meeting #90-e, RP-202638, Electronic Meeting, Dec. 7-11, 2020, 5 Pages, Nov. 30, 2020.

* cited by examiner

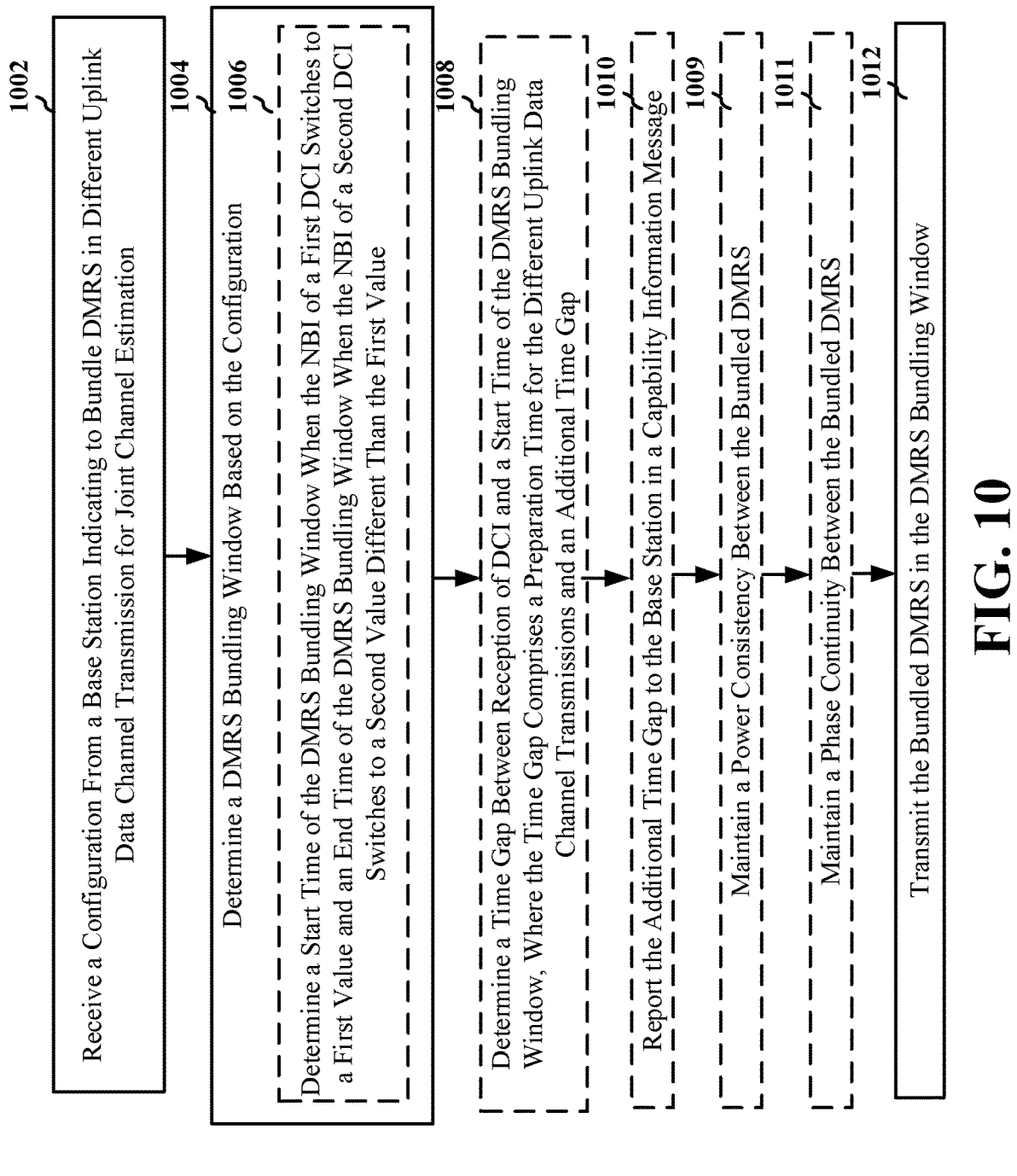

1002

Receive a Configuration From a Base Station Indicating to Bundle DMRS in Different Uplink Data Channel Transmission for Joint Channel Estimation

1004

1006

Determine a DMRS Bundling Window Based on the Configuration

Determine a Start Time of the DMRS Bundling Window When the NBI of a First DCI Switches to a First Value and an End Time of the DMRS Bundling Window When the NBI of a Second DCI Switches to a Second Value Different Than the First Value

1008

Determine a Time Gap Between Reception of DCI and a Start Time of the DMRS Bundling Window, Where the Time Gap Comprises a Preparation Time for the Different Uplink Data Channel Transmissions and an Additional Time Gap

1010

Report the Additional Time Gap to the Base Station in a Capability Information Message

1009

Maintain a Power Consistency Between the Bundled DMRS

1011

Maintain a Phase Continuity Between the Bundled DMRS

1012

Transmit the Bundled DMRS in the DMRS Bundling Window

1102 Transmit a Configuration to a UE Indicating to Bundle DMRS in Different Uplink Data Channel Transmission for Joint Channel Estimation 1104 Receive the Bundled DMRS in a DMRS Bundling Window Based on the Configuration 1106 Receive the Additional Time Gap from the UE in a Capability Information Message 1108 Perform the Joint Channel Estimation Based on the Bundled DMRS

1100

PUSCH DMRS BUNDLING INDICATION FOR DIFFERENT TRANSPORT BLOCKS

CROSS REFERENCE TO RELATED APPLICATION(S)

This application is a National Phase entry of PCT Application No. PCT/CN2022/071786, entitled "PUSCH DMRS BUNDLING INDICATION FOR DIFFERENT TRANS-PORT BLOCKS" and filed on Jan. 13, 2022, which claims priority of U.S. Provisional Application No. 63/137,682, entitled "PUSCH DMRS BUNDLING INDICATION FOR DIFFERENT TRANSPORT BLOCKS" and filed on Jan. 14, 2021, both of which are expressly incorporated by reference herein in their entirety.

BACKGROUND

Technical Field

The present disclosure generally relates to communication systems, and more particularly, to a wireless communication system between a user equipment (UE) and a base station.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus receives a configuration from a base station indicating to bundle demodulation reference signals (DMRS) in different uplink data channel transmissions for joint channel estimation. The apparatus determines a DMRS bundling window based on the configuration, and transmits the bundled DMRS in the DMRS bundling window.

In an aspect of the disclosure, a method, a computer-readable medium, and an apparatus are provided. The apparatus may be a base station. The apparatus transmits a configuration to a UE indicating to bundle DMRS in different uplink data channel transmissions for joint channel estimation. The apparatus receives the bundled DMRS in a DMRS bundling window based on the configuration, and performs the joint channel estimation based on the bundled DMRS.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 10 is a flowchart of a method of wireless communication at a UE.

DETAILED DESCRIPTION

Figure 1:
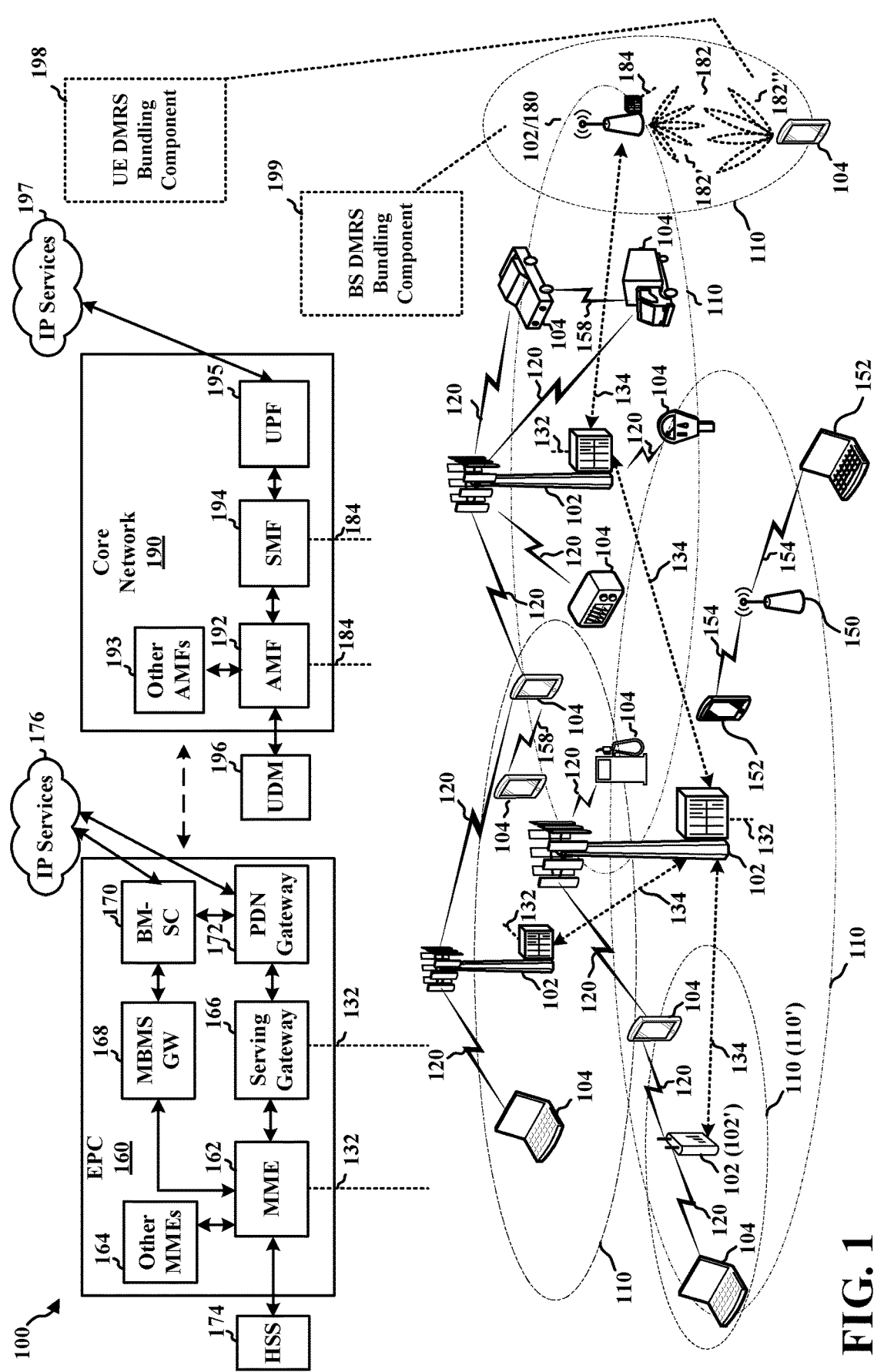
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

When a UE transmits data on a physical uplink shared channel (PUSCH), the UE may transmit demodulation reference signals (DMRS) in each slot carrying the data. For example, when transmitting DMRS on PUSCH, the UE may transmit DMRS in consecutive slots carrying different uplink data transmissions scheduled by the base station. The base station may process the DMRS to produce channel estimates for demodulation of the PUSCH. For example, the base station may measure a reference signal receive power (RSRP) of the DMRS in symbols of one of the slots, and determine a channel quality indicator (CQI) based on the RSRP for the DMRS in that particular slot. The base station may similarly measure RSRP and determine CQI from DMRS in other individual slots. Thus, the base station may estimate the channel using DMRS individually for each slot.

However, in some cases, such processing of DMRSs individually for each slot may result in channel estimation errors. For example, if the UE is located at a cell edge, the RSRP of the DMRS may change between slots (e.g., due to interference between the UE and the base station or other factors), and thus the CQI which the base station may determine individually for one slot may be inaccurate for the next slot. As a result, if the base station performs link adaptation based on an erroneous channel estimation, the communication link quality between the base station and the UE may be degraded.

To prevent such degradation in link quality based on erroneous channel estimates, DMRS bundling may be applied. In DMRS bundling, when a transmitter (e.g., a UE) transmits DMRS to a receiver (e.g., a base station) in multiple slots, for instance one of the DMRS in one slot, another one of the DMRS in a next slot, and so forth, the transmitter maintains power consistency and phase continuity between the DMRS. For example, to maintain phase continuity between the DMRS, the DMRS may be transmitted using the same modulation and coding scheme (MCS) (e.g., binary phase shift keying (BPSK) or quadrature phase shift keying (QPSK)), the DMRS may be transmitted in slots using the same duplexing scheme (e.g., time division duplexing (TDD) or frequency division duplexing (FDD)), or the DMRS may be transmitted using continuous, allocated time-domain resources. Similarly, to maintain power consistency between the DMRS, the DMRS may be transmitted using the same transmit power. After the receiver receives the bundled DMRS in the multiple slots, the receiver jointly processes the DMRS (e.g., for channel estimation). For example, the receiver may measure an average RSRP from the RSRPs of the power-consistent and phase-continuous DMRS in the multiple slots, and identify CQI from the average RSRP. Thus, the receiver may jointly process the DMRS across multiple slots. In this way, the likelihood of erroneous channel estimates due to RSRP changes between slots may be reduced (and signal gains may result) due to DMRS bundling.

Thus, improved link quality through joint channel estimation and signal gains may result from applying DMRS bundling over different transport blocks of PUSCH transmissions. Therefore, it would be desirable to specify a mechanism to enable DMRS bundling or joint channel estimation over multiple transport blocks of different PUSCH transmissions (e.g., with consistent DMRS transmit power and phase continuity). To this end, aspects of the present disclosure are provided which allow a base station to configure DMRS bundling (and thus enable joint channel estimation), and which allow a UE to determine the PUSCH transmissions in which DMRS is to be bundled (e.g., a DMRS bundling window) based on the configuration. For example, when the base station configures DMRS bundling in multiple different PUSCH transmissions, the base station may configure the UE to maintain power consistency and phase continuity between the DMRS in the transmissions so that, when the base station receives the power-consistent and phase-continuous DMRS, the base station may jointly process the DMRS (e.g., for channel estimation). Moreover, the UE may determine a DMRS bundling window, including a start time corresponding to one of the transmissions (e.g. one transport block) and an end time corresponding to another one of the transmissions (e.g. another transport block), in which the UE is to maintain the power consistency and phase continuity between the DMRS. As a result, when the base station indicates the UE to bundle DMRS, the base station may configure the UE to transmit power consistent and phase continuous DMRS across multiple PUSCH slots within the determined DMRS bundling window, and when the base station receives bundled DMRS, the base station may perform joint channel estimation based on the received, power-consistent and phase-continuous DMRS within DMRS bundling window. In this way, the aforementioned benefits of improved link quality and signal gains through DMRS bundling may be achieved.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UE DMRS bundling component 198. The UE DMRS bundling component 198 is configured to receive a configuration from a base station indicating to bundle DMRS in different uplink data channel transmissions for joint channel estimation, determine a DMRS bundling window based on the configuration, and transmit the bundled DMRS in the DMRS bundling window.

Referring again to FIG. 1, in certain aspects, the base station 102/180 may include a BS DMRS bundling component 199. The BS DMRS bundling component 199 is configured to transmit a configuration to a UE indicating to bundle DMRS in different uplink data channel transmissions for joint channel estimation, receive the bundled DMRS in a DMRS bundling window based on the configuration, and perform the joint channel estimation based on the bundled DMRS.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figures 2A, 2B, 2C, 2D:
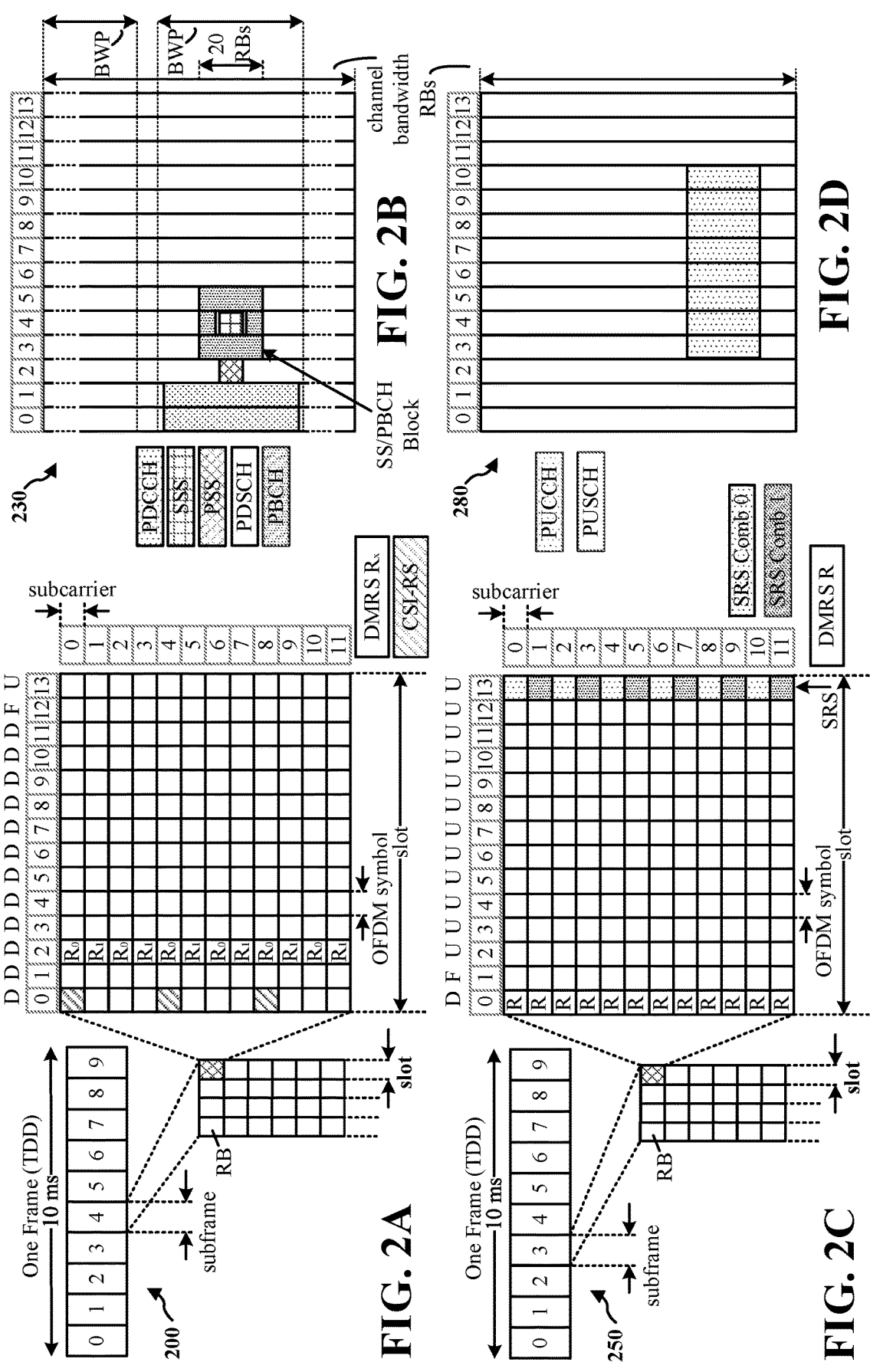
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
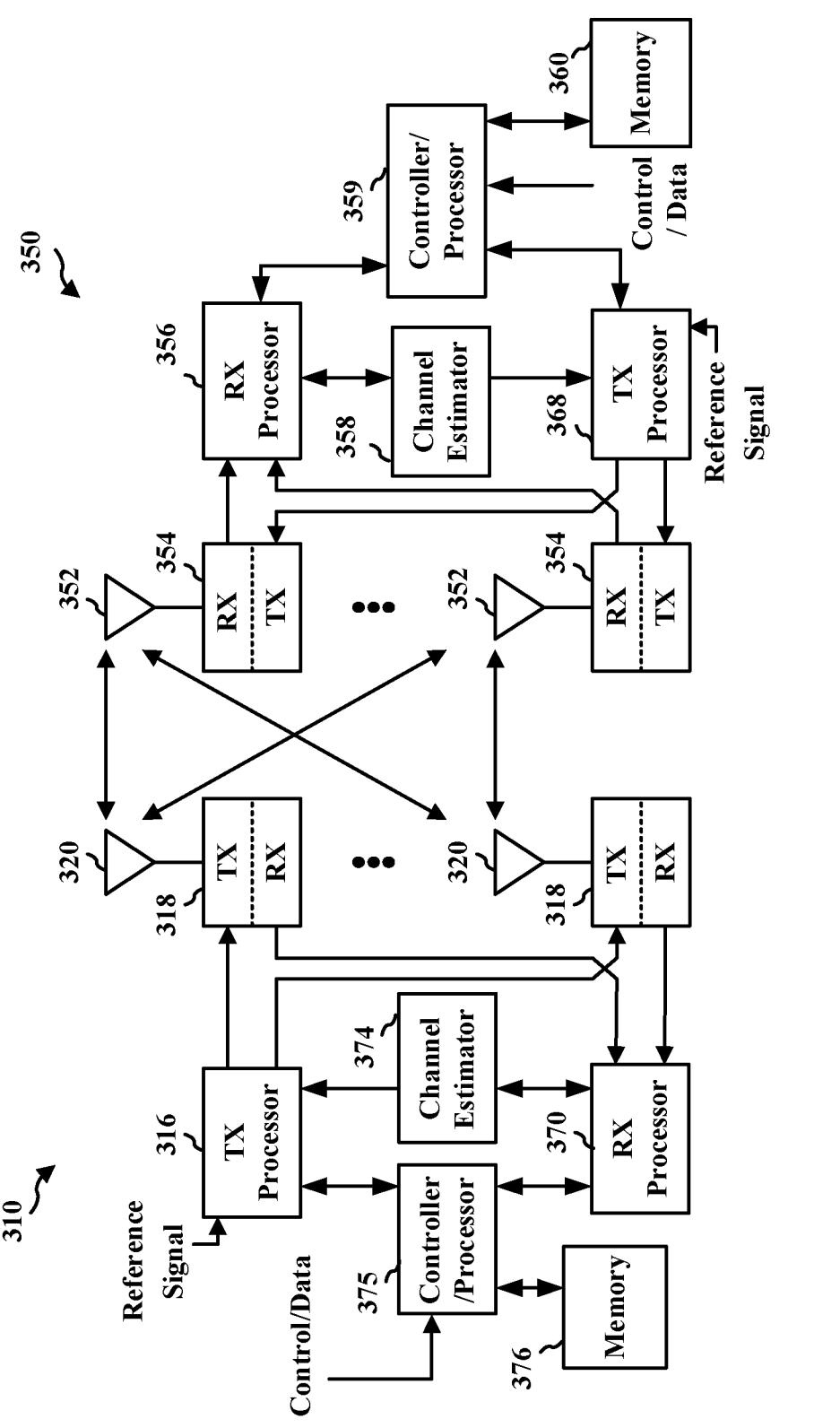
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with UE DMRS bundling component 198 of FIG. 1.

At least one of the TX processor 316, the RX processor 370, and the controller/processor 375 may be configured to perform aspects in connection with BS DMRS bundling component 199 of FIG. 1.

When a base station schedules a UE to transmit different transport blocks of uplink data in PUSCH, the scheduling may be accomplished using dynamic grants. When scheduling uplink data in PUSCH in a dynamic grant, the base station may transmit a DCI to the UE including a time domain resource assignment that indicates parameters associated with one or more different PUSCH transmissions, such as a slot offset, a start and length indicator value (SLIV), and a PUSCH mapping type (e.g., PUSCH mapping type A or B). The base station may also transmit a PUSCH configuration (e.g., pusch-Config or another name) via dedicated RRC signaling to the UE, which may include a time domain allocation list indicating the parameters associated with the time domain resource assignment in DCI.

Figures 4A, 4B:
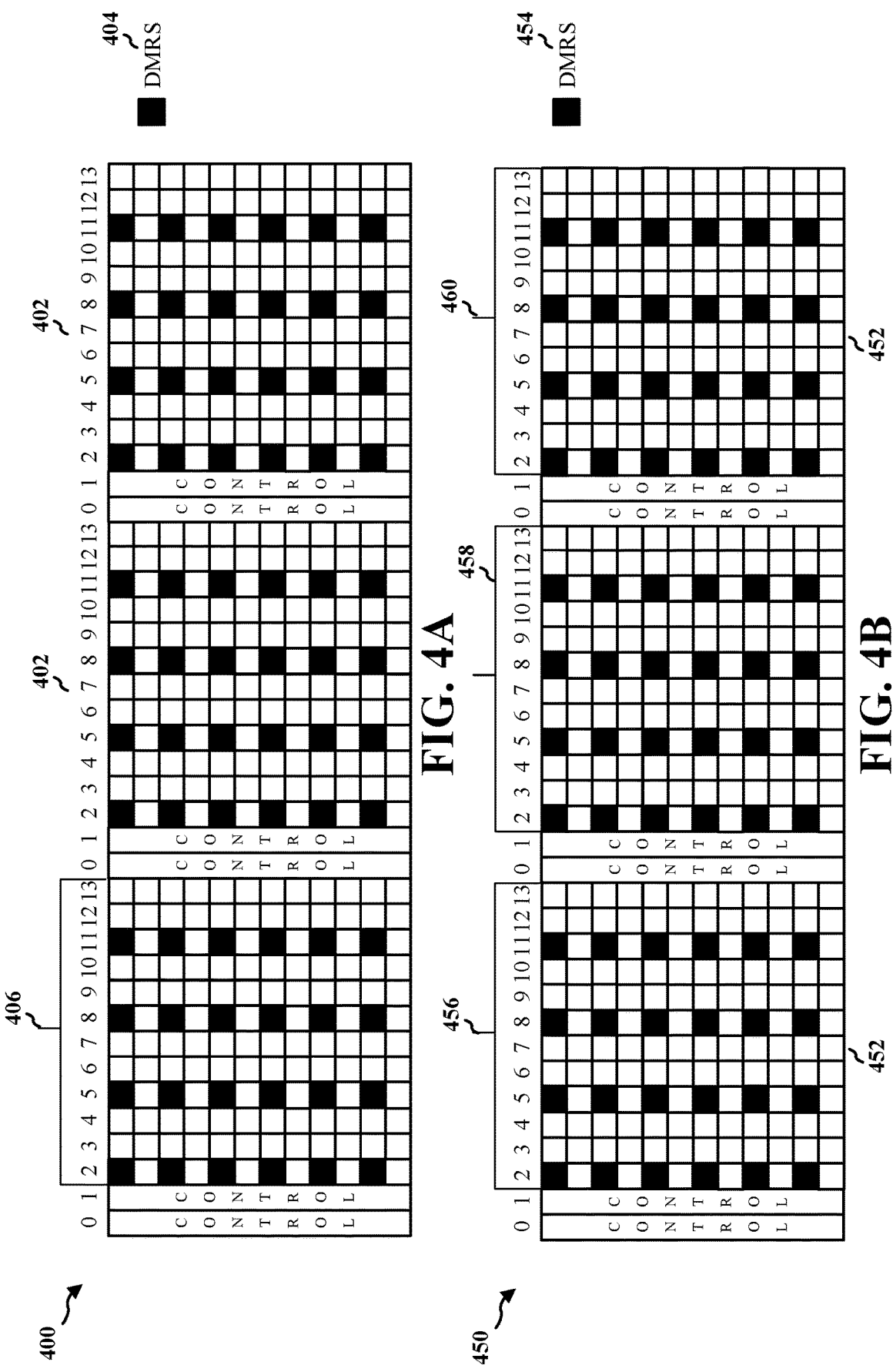
FIGS. 4A and 4B are diagrams illustrating examples of DMRS carried in repetitions of an uplink data channel transmission.

Additionally, when a UE transmits data on an uplink data channel (e.g., on PUSCH), the UE may transmit a DMRS in each slot carrying the data. For example, when transmitting DMRS on PUSCH, the UE may transmit DMRS in consecutive slots carrying different uplink data transmissions scheduled using one or more dynamic grants. The base station may process the DMRS to produce channel estimates for demodulation of the PUSCH. For instance, FIG. 4A illustrates an example 400 of multiple slots 402 carrying data in PUSCH including DMRS 404. The data transmitted in each of the slots 402 may be different from each other (e.g., different transport blocks). When the base station receives the data in each of the slots 402, the base station may process the DMRS 404 in each slot individually for channel estimation. For example, the base station may measure a RSRP of the DMRS 404 in symbols 406 of one of the slots 402, and determine a CQI based on the RSRP for the DMRS in that particular slot. The base station may similarly measure RSRP and determine CQI from DMRS in other individual slots. Thus, the base station may estimate the channel using DMRS individually for each slot.

However, in some cases, such processing of DMRS individually for each slot may result in channel estimation errors. For example, if the UE is located at a cell edge, the RSRP of the DMRS may change between slots (e.g., due to interference between the UE and the base station or other factors), and thus the CQI which the base station may determine individually for one slot may be inaccurate for the next slot. As a result, if the base station performs link adaptation based on an erroneous channel estimation, the communication link quality between the base station and the UE may be degraded.

To prevent such degradation in link quality based on erroneous channel estimates, DMRS bundling may be applied. In DMRS bundling, when a transmitter (e.g., a UE) transmits DMRS to a receiver (e.g., a base station) in multiple slots, for instance one of the DMRS in one slot, another one of the DMRS in a next slot, and so forth, the transmitter maintains phase continuity and power consistency between the DMRS. For example, to maintain phase continuity between the DMRS, the DMRS may be transmitted using the same MCS (e.g., BPSK or QPSK), the DMRS may be transmitted in slots using the same duplexing scheme (e.g., TDD or FDD), or the DMRS may be transmitted using continuous, allocated time-domain resources. Similarly, to maintain power consistency between the DMRS or the DMRS may be transmitted using the same transmit power. After the receiver receives the bundled DMRS in the multiple slots, the receiver jointly processes the DMRS (e.g., for channel estimation). For example, the receiver may measure an average RSRP from the RSRPs of the power-consistent and phase-continuous DMRS in the multiple slots, and identify CQI from the average RSRP. Thus, the receiver may jointly process the DMRS across multiple slots. In this way, the likelihood of erroneous channel estimates due to RSRP changes between slots may be reduced due to DMRS bundling.

For instance, FIG. 4B illustrates an example 450 of multiple slots 452 carrying data in PUSCH including bundled DMRS 454. The data transmitted in each of the slots 402 may be different from each other (e.g., different transport blocks). Moreover, the DMRS in each of the slots 452 are power-consistent and phase-continuous (bundled). Accordingly, when the base station receives the data in each of the slots 402, the base station may jointly process the bundled DMRS 454 in the slots for channel estimation. For example, the base station may perform joint channel estimation by measuring an average RSRP of the DMRS in symbols 456, 458, and 460 of each of the slots 402, and determining a CQI based on the average RSRP for the DMRS in the multiple slots. Thus, the risk of erroneous channel estimation due to RSRP changes between the slots 452 may be reduced.

Figure 5:
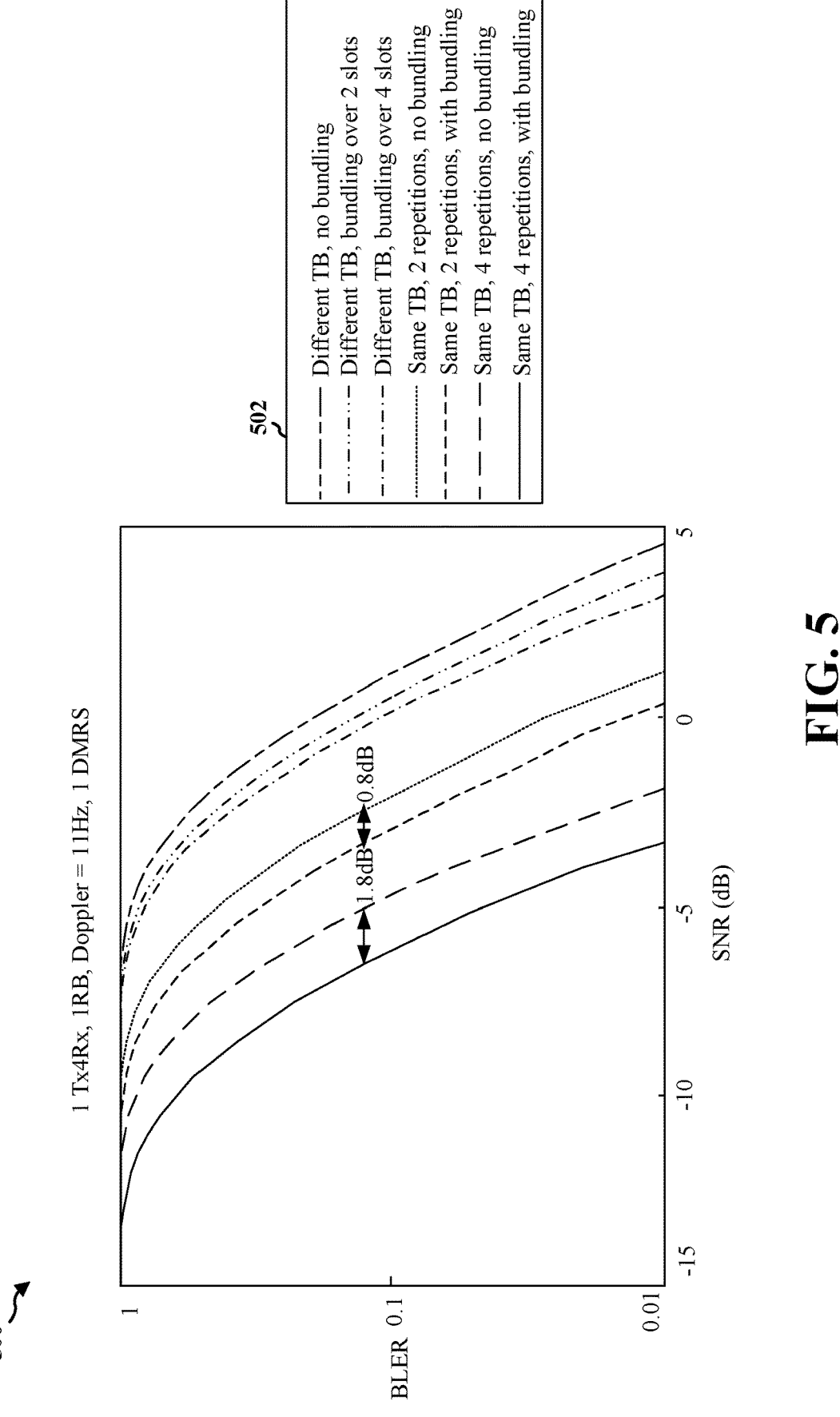
FIG. 5 is a diagram illustrating an example of a chart showing different relationships between signal to noise ratios and block error rates for transport blocks with and without DMRS bundling.

In addition to lowering the risk of erroneous channel estimates, DMRS bundling may result in signal gains. FIG. 5 illustrates an example of a chart 500 showing signal gains which may occur due to DMRS bundling. The curves 502 illustrate block error rates (BLERs) and signal to noise ratios (SNRs) experienced by a UE respectively for slots carrying data from different transport blocks (e.g., different PUSCH transmissions such as described above with respect to FIGS. 4A and 4B) and from duplicate transport blocks (e.g., repetitions of PUSCH transmissions). This example also assumes the UE has a single transmitting antenna and four receiving antennas, that the UE transmits data including a single DMRS symbol in a single resource block (RB) or slot to a base station, and that a frequency shift (Doppler) of 11 Hz exists between the UE and the base station. As shown in the chart, applying DMRS bundling for joint channel estimation has been found to result in signal gains of approximately 0.8-1.8 dB depending on the number of slots that include the bundled DMRS.

Thus, FIGS. 4B and 5 illustrate the benefits (e.g., improved link quality through joint channel estimation and signal gains) which may result from applying DMRS bundling over different transport blocks of PUSCH transmissions. Moreover, joint channel estimation may be supported across different transport blocks of uplink data scheduled using one or more dynamic grants. Therefore, it would be desirable to specify a mechanism to enable DMRS bundling or joint channel estimation over multiple transport blocks of different PUSCH transmissions (e.g., with consistent DMRS transmit power and phase continuity).

To this end, aspects of the present disclosure are provided which allow a base station to configure DMRS bundling (and thus enable joint channel estimation), and which allow a UE to determine the PUSCH transmissions in which DMRS is to be bundled (e.g., a DMRS bundling window) based on the configuration. For example, when the base station configures DMRS bundling in multiple different PUSCH transmissions, the base station may configure the UE to maintain power consistency and phase continuity between the DMRS in the transmissions so that, when the base station receives the power-consistent and phase-continuous DMRS, the base station may jointly process the DMRS (e.g., for channel estimation). Moreover, the UE may determine a DMRS bundling window, including a start time corresponding to one of the transmissions (e.g. one transport block) and an end time corresponding to another one of the transmissions (e.g. another transport block), in which the UE is to maintain the power consistency and phase continuity between the DMRS. As a result, when the base station indicates the UE to bundle DMRS, the base station may configure the UE to transmit power consistent and phase continuous DMRS across multiple PUSCH slots within the determined DMRS bundling window, and when the base station receives bundled DMRS, the base station may perform joint channel estimation based on the received, power-consistent and phase-continuous DMRS within the DMRS bundling window. In this way, the aforementioned benefits of improved link quality and signal gains through DMRS bundling may be achieved.

Although the following examples to be described with respect to DMRS bundling refer to situations where the PUSCH transmissions occupy the same frequency (e.g. the same 12 subcarriers of multiple physical resource blocks without frequency hopping such as illustrated in FIG. 4B), the transmissions may alternatively occupy multiple frequencies (e.g. with inter-slot frequency hopping) in other examples. Thus, joint channel estimation based on DMRS bundling may be performed with or without inter-slot frequency hopping. Additionally, although the following examples to be described with respect to DMRS bundling refer to PUSCH transmissions occupying a single DMRS bundling window, the transmissions may alternatively occupy or be split across multiple, consecutive or inconsecutive DMRS bundling windows in other examples. The parameters for each of these multiple DMRS bundling windows, for example a duration or start/end time for each window, may be configured in a same or similar manner as for a single DMRS bundling window such as described below.

In a first example, the base station may provide the UE with a configuration indicating or enabling the UE to perform DMRS bundling for joint channel estimation across dynamically scheduled PUSCH transmissions carrying different transport blocks. For instance, when the PUSCH transmissions are dynamically scheduled in one or more DCIs, the base station may provide the configuration enabling DMRS bundling to the UE within the PUSCH configuration (e.g., PUSCH-Config). The configuration may be, for example, one or more bits or flags indicating whether the UE is to bundle DMRS (e.g., maintain power consistency and phase continuity of DMRS) in slots carrying different uplink data on PUSCH, so that the base station may perform joint channel estimation on received DMRS from the UE. The same configuration (e.g., bits or flags) may enable DMRS bundling for different transport blocks of PUSCH transmissions as well as for duplicate transport blocks (repetitions) of PUSCH transmissions. Alternatively, different configurations (e.g., bits or flags) may enable DMRS bundling for different and same transport blocks of PUSCH transmissions. For instance, the configuration may include one or more bits indicating the UE to transmit the DMRS in each slot of a different PUSCH transmission with the same MCS, with the same TDD or FDD duplexing scheme, in continuous time-domain resources, or with the same transmit power. Thus, in this example, the UE may determine the DMRS bundling window to encompass the dynamically scheduled PUSCH transmissions in one or more DCIs, and the base station may perform joint channel estimation of DMRS within the DMRS bundling window.

Figure 6:
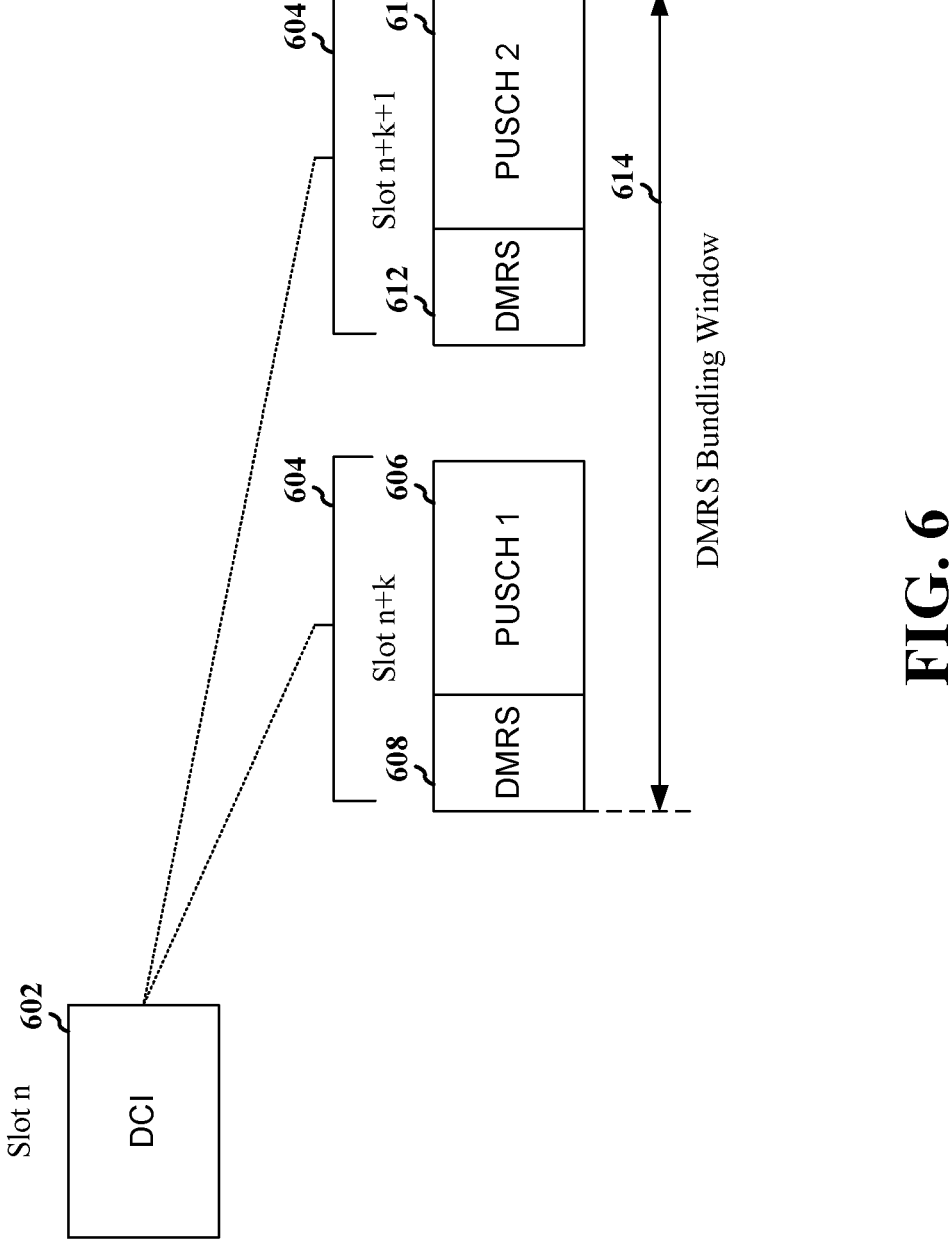
FIG. 6 is a diagram illustrating an example of a DMRS bundling window encompassing different uplink data channel transmissions.

In a second example, when the base station provides a DCI to the UE scheduling multiple PUSCH transmissions in different transport blocks, the DCI may indicate the DMRS bundling window, including a starting slot and an ending slot or duration, in which the DMRS of the scheduled PUSCH transmissions are to be bundled for joint channel estimation. For example, the DCI may indicate a set of subsequent slots in which the UE is to transmit different uplink data, and the UE may determine the DMRS bundling window as corresponding to this set of subsequent slots. The UE maintains power consistency and phase continuity in the DMRS carried in these slots when bundling DMRS within the DMRS bundling window. For instance, FIG. 6 illustrates an example 600 where a UE receives a DCI 602 at slot n scheduling different uplink data transmissions in a plurality of slots 604, including a first PUSCH transmission 606 with DMRS 608 at slot n+k and a second PUSCH transmission 610 with DMRS 612 at slot n+k+1. Slots 604 may correspond to slots 452 and DMRS 612 may correspond to bundled DMRS 454 in FIG. 4B. In such case, the DCI 602 may indicate DMRS bundling to begin at slot n+k and to end at slot n+k+1. Thus, the UE may determine a DMRS bundling window 614 to encompass the first and second PUSCH transmissions (slots n+k and n+k+1) in response to the DCI 602. Upon determining the DMRS bundling window, the UE may bundle the DMRS 608, 612 in the slots 604 within the window by transmitting the DMRS in each slot with the same MCS, with the same TDD or FDD duplexing scheme, in continuous time-domain resources, or with the same transmit power in order to maintain power consistency and phase continuity between the DMRS. Once the base station receives the bundled DMRS, the base station may perform joint channel estimation (e.g., by identifying an average RSRP of the DMRS 608, 612 in the slots 604 within DMRS bundling window 614).

Although FIG. 6 illustrates the example 600 where the DCI 602 schedules two different PUSCH transmissions 606, 610 and indicates two slots 604 for the DMRS bundling window, in other examples, the DCI may schedule any number of different PUSCH transmissions and indicate any number of slots for DMRS bundling (which may be equal to or less than the number of PUSCH transmissions). For instance, if the DCI 602 indicates that DMRS bundling is to begin at slot n+k and to end at slot n+k+3 (four slots), the UE may determine that the DMRS bundling window 614 encompasses four slots of different PUSCH transmissions scheduled by that DCI. In another example, if the DCI 602 schedules four different PUSCH transmissions from slot n+k to slot n+k+3, but indicates DMRS bundling is to occur at slots n+k and n+k+1 (but not at slots n+k+2 and n+k+3), the UE may determine DMRS bundling window 614 to encompass the two indicated slots.

In a third example, when the base station provides multiple DCIs to the UE each scheduling a different PUSCH transmission in a respective transport block, the DCIs may each include a new bundling indicator (NBI) bit that the base station may configure to indicate the DMRS bundling window. The base station may toggle the NBI in each DCI to indicate to the UE when a DMRS bundling window starts and ends. For example, if the base station configures the NBI of one DCI to have a same value than the NBI of a previous DCI (e.g., both NBIs are 0 or both NBIs are 1), the UE may determine that the PUSCH transmissions scheduled by both DCIs are within the same DMRS bundling window. On the other hand, if the base station configures the NBI of one DCI to have a different value than the NBI of a previous DCI (e.g., one NBI is 0 and the other NBI is 1), the UE may determine that the PUSCH transmissions scheduled by both DCIs are within different DMRS bundling windows. Thus, based on the NBI of each DCI, the UE may determine which slots of scheduled PUSCH transmissions including DMRS are to be bundled with each other, and thus the start and end times of each DMRS bundling window. The UE maintains power consistency and phase continuity in the DMRS carried in these slots when bundling DMRS within each DMRS bundling window.

Figure 7:
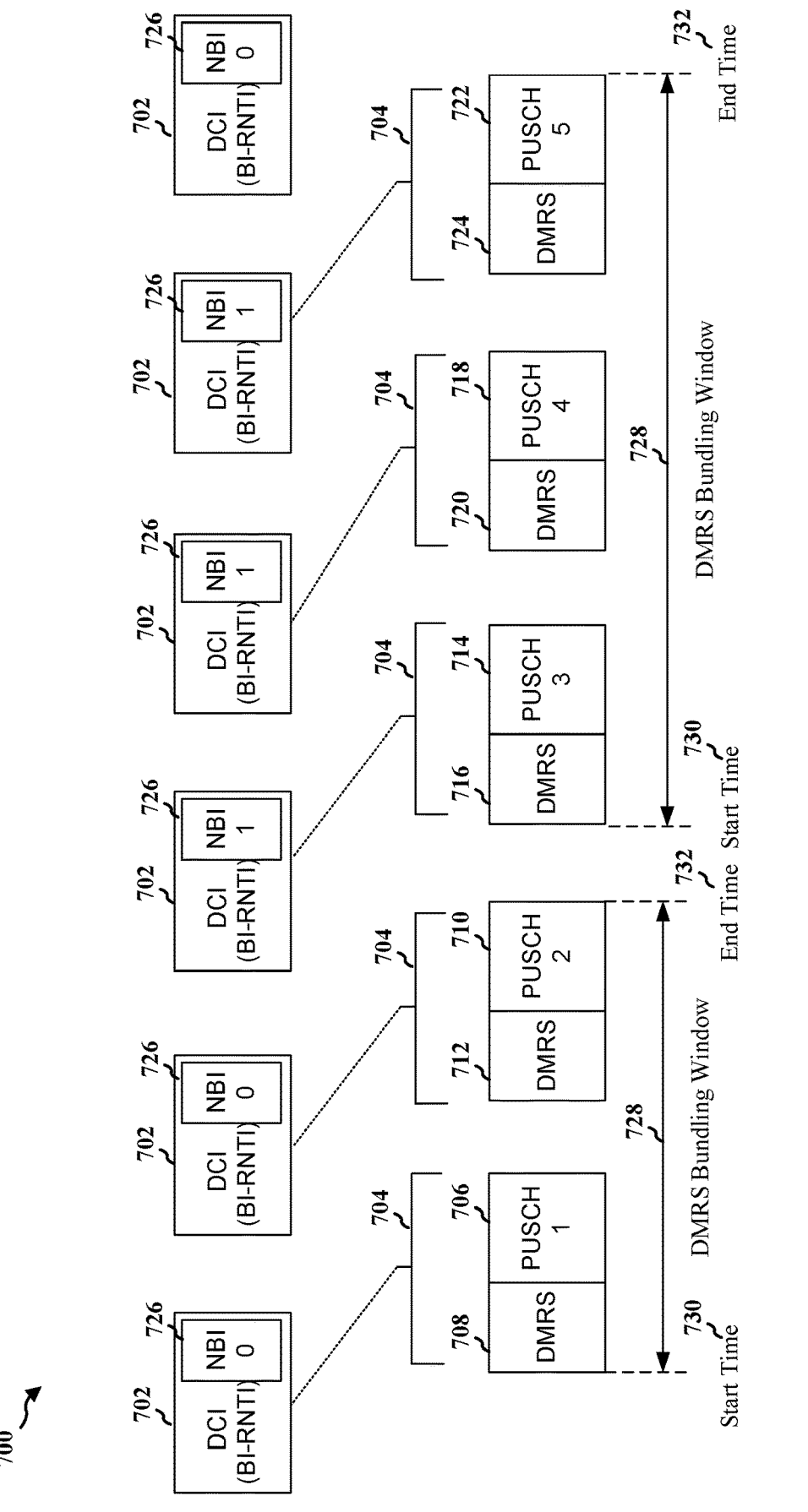
FIG. 7 is a diagram illustrating another example of DMRS bundling windows respectively encompassing different uplink data channel transmissions.

For instance, FIG. 7 illustrates an example 700 where a UE receives DCIs 702 each scheduling a different uplink data transmission in a respective one of a plurality of slots 704, including a first PUSCH transmission 706 with DMRS 708 in a first slot, a second PUSCH transmission 710 with DMRS 712 in a second slot, a third PUSCH transmission 714 with DMRS 716 in a third slot, a fourth PUSCH transmission 718 with DMRS 720 in a fourth slot, and a fifth PUSCH transmission 722 with DMRS 724 in a fifth slot. Each slot may correspond to slots 452 and each DMRS may correspond to bundled DMRS 454 in FIG. 4B. Each DCI may respectively include a NBI 726 which is configured to have a value of 0 or 1 to determine the size of DMRS bundling windows 728. For example, the UE may determine a first one of the DMRS bundling windows 728 to correspond to the first and second PUSCH transmissions, and a second one of the DMRS bundling windows 728 to correspond to the third, fourth, and fifth PUSCH transmissions. The UE may determine a start time 730 and stop time 732 of each DMRS bundling window based on the NBI 726 of each DCI 702. For instance, the UE may determine that the second one of the DMRS bundling windows starts, and the first one of the DMRS bundling window ends, in response to toggling of the NBI (from 0 to 1 in this example) in the DCIs scheduling the second and third PUSCH transmissions. Similarly, the UE may determine that the second one of the DMRS bundling windows ends (and thus that another DMRS bundling window may start) in response to toggling again of the NBI (from 1 to 0 in this example) in a subsequent DCI after the DCI scheduling the fifth PUSCH transmission. Upon determining each DMRS bundling window, the UE may bundle the DMRS in the slots 704 within each window by transmitting the DMRS in each of those slots with the same MCS, with the same TDD or FDD duplexing scheme, in continuous time-domain resources, or with the same transmit power in order to maintain power consistency and phase continuity between the DMRS. Once the base station receives the bundled DMRS, the base station may perform joint channel estimation (e.g., by identifying an average RSRP of the DMRS in the slots 704 within each DMRS bundling window).

Additionally, each DCI scheduling one or more different PUSCH transmissions may include a specific DCI format indicating the DMRS in these different transport blocks are to be bundled. The specific DCI format indicating DMRS bundling may be different from other DCI formats which do not indicate DMRS bundling (e.g., DCI formats 0_0, 0_1, 1_0, 1_1, 2_0, 2_1, 2_2, and 2_3). For instance, the DCI format indicating DMRS bundling may include NBI (e.g., NBI 726), which the UE may identify to determine DMRS bundling windows.

Moreover, to configure a particular UE to perform DMRS bundling in response to a DCI, the base station may assign a bundling indication radio network temporary identifier (BI-RNTI) to that UE. The BI-RNTI may be UE-specific or group-specific (associated with a group of UEs including the UE). When the base station subsequently configures a DCI to enable that particular UE to perform DMRS bundling in one or more scheduled PUSCH transmissions, the base station may attach a cyclic redundancy check (CRC) to the DCI which is scrambled by that UE's BI-RNTI. When the UE receives the DCI scheduling the PUSCH transmission(s), the UE may decode the DCI including the CRC to identify the BI-RNTI, and if the decoded BI-RNTI matches the BI-RNTI of the UE, the UE may determine that the base station is configuring the UE to bundle the DMRS in that scheduled transmission(s). As a result, the UE may determine a DMRS bundling window (e.g. DMRS bundling window 614 or 728), and the UE may bundle the DMRS in the slots 604, 704 within each window by transmitting the DMRS in each of those slots with the same MCS, with the same TDD or FDD duplexing scheme, in continuous time-domain resources, or with the same transmit power in order to maintain power consistency and phase continuity between the DMRS. Once the base station receives the bundled DMRS, the base station may perform joint channel estimation (e.g., by identifying an average RSRP of the DMRS in the slots 604, 704 within each DMRS bundling window).

In a fourth example, the UE may be scheduled to transmit different transport blocks of uplink data in PUSCH a number of symbols following reception of the DCI. This number of symbols may represent a PUSCH preparation procedure time $T_{proc,2}$, where $T_{proc,2}$ is a function of PUSCH preparation time $N_2$ and a time $d_{2,1}$, where $N_2$ is based on a numerology $\mu$ for UE processing capability 1, where $\mu$ corresponds to the one of $(\mu_{DL}, \mu_{UL})$ resulting with the largest $T_{proc,2}$ (the smaller value or subcarrier spacing (SCS) between $\mu_{DL}, \mu_{UL}$), where the $\mu_{DL}$ corresponds to the subcarrier spacing at with the PDCCH carrying the DCI scheduling the PUSCH was transmitted and $\mu_{UL}$ corresponds to the subcarrier spacing at which the PUSCH is to be transmitted. For example, the preparation time $N_2$ for UE processing capability 1 may be 10, 12, 23, or 36 symbols depending on whether the smaller SCS between the SCS associated with the DCI and the SCS associated with the uplink data transmissions is 15 kHz ($\mu$=0), 30 kHz ($\mu$=1), 60 kHz ($\mu$=2), or 120 kHz ($\mu$=3). Moreover, the number of symbols representing PUSCH preparation procedure time $T_{proc,2}$ assumes that the first symbol of the PUSCH allocation consists of DMRS only ($d_{2,1}$=0). Thus, the UE may determine a preparation time gap of at least 10, 12, 23, or 36 symbols between reception of the DCI and the first DMRS to be transmitted in PUSCH.

Moreover, the UE may determine the DMRS bundling window to start an additional number of symbols after the PUSCH preparation procedure time $T_{proc,2}$. This additional number of symbols may represent an additional time gap d, between reception of the DCI and transmission of uplink data on PUSCH. Thus, the start time of the DMRS bundling window may correspond to an initial PUSCH transmission (e.g., an initial transport block) scheduled to be transmitted $T_{proc,2}$+d symbols after reception of DCI, while the end time of the DMRS bundling window may correspond to a last PUSCH transmission scheduled to be transmitted by the DCI (e.g., a final transport block). As in the previous examples, the UE maintains power consistency and phase continuity in DMRS of adjacent PUSCH transmissions when bundling DMRS within the DMRS bundling window. In contrast, for DMRS not within the DMRS bundling window (e.g., DMRS that are transmitted during the additional time gap d), the UE does not actively seek to maintain power consistency and phase continuity between those DMRS, since those DMRS are not bundled.

The additional time gap d may be an element of a set of durations (e.g., $d \in \{0,1,2\}$ symbols, or a set of some other numbers of symbols), which the UE may determine based on SCS. For example, similar to when calculating $T_{proc,2}$, the UE may determine the smaller SCS between the SCS associated with the DCI and the SCS associated with the PUSCH transmissions, and identify the additional time gap d as either 0, 1, or 2 symbols depending on the value of the smaller SCS.

Additionally, the UE may report the additional time gap d which the UE determines to apply for its PUSCH transmissions as a UE capability. For instance, when the base station sends a UE capability inquiry message to the UE during initial access or some other time, the UE may report in a capability information message to the base station the additional time gap d that the UE has selected based on SCS (and thus is capable of applying for DMRS bundling). For example, the UE may report to the base station that the UE is capable of applying an additional time gap $d \in \{0,1,2\}$ symbols between reception of the DCI and the start of the DMRS bundling window. Thus, when the UE transmits its uplink data on PUSCH according to the determined additional time gap d, the base station may monitor for the PUSCH transmissions accordingly based on the capability information message. For instance, the base station may determine that bundled DMRS will be received 0, 1, or 2 symbols after $T_{proc,2}$ depending on the value of d indicated in the capability information message.

Figure 8:
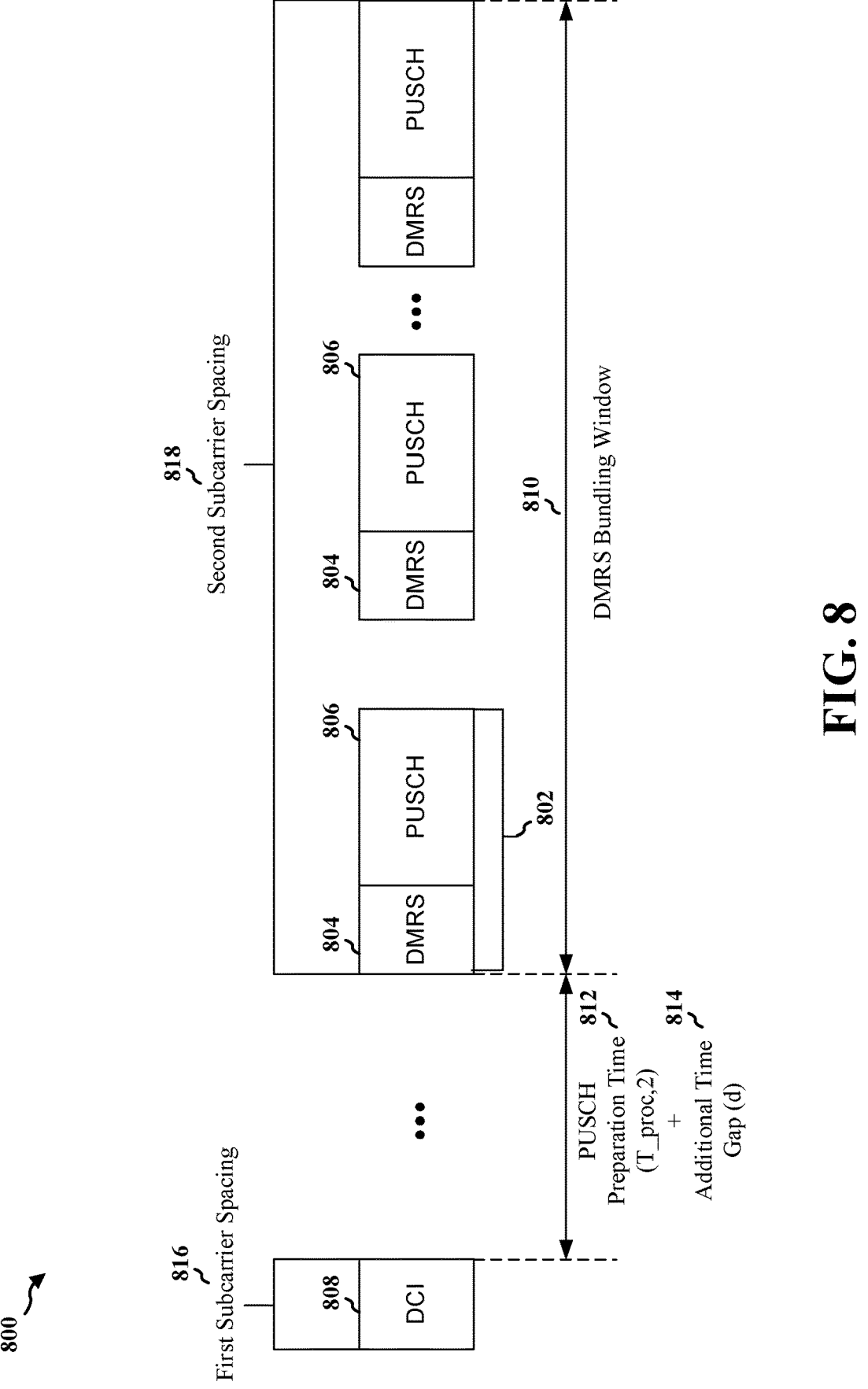
FIG. 8 is a diagram illustrating a further example of a DMRS bundling window encompassing different uplink data channel transmissions.

For instance, FIG. 8 illustrates an example 800 of slots 802 each including DMRS 804 and uplink data on PUSCH 806 which the UE is scheduled to transmit in DCI 808. Slots 802 may correspond to slots 452 and DMRS 804 may correspond to bundled DMRS 454 in FIG. 4B. The base station may schedule the UE via DCI 808 to transmit uplink data on PUSCH in different transport blocks. When the UE receives the DCI 808, the UE may determine a DMRS bundling window 810, which start time corresponds to one of the configured PUSCH transmissions that is scheduled to occur after a PUSCH preparation time 812 ($T_{proc,2}$) and an additional time gap 814 (d). The additional time gap 814 may be determined based on the smaller SCS between a SCS 816 associated with the DCI 808 and a SCS 818 associated with the slots 802 including the PUSCH transmissions. The end time of the DMRS bundling window may correspond to a last one of the configured PUSCH transmissions scheduled in DCI 808. Upon determining the DMRS bundling window, the UE may bundle the DMRS 804 in the slots 802 within the window by transmitting the DMRS in each consecutive or adjacent slot with the same MCS, with the same TDD or FDD duplexing scheme, in continuous time-domain resources, or with the same transmit power in order to maintain power consistency and phase continuity between the DMRS. Once the base station receives the bundled DMRS, the base station may perform joint channel estimation (e.g., by identifying an average RSRP of the DMRS 804 in the slots 802 within DMRS bundling window 810).

Additionally, the base station may provide the UE a configuration of the DMRS bundling window including a size or duration of the window and a start time or slot of the window. The configuration may define the size or duration of the DMRS bundling window as a number of symbols including uplink and downlink symbols, a number of slots including uplink and downlink slots, a number of subframes, a number of frames, or an amount of time. Thus, the DMRS bundling window may be defined in terms of a total number of symbols, slots, subframes, frames, milliseconds, or some other representation of time. For example, if a UE is scheduled to transmit different PUSCH transmissions in a sequence of ten slots having the following format: DDD-UUDDDUU (where D represents a downlink slot and U represents an uplink slot), the configuration may explicitly indicate the size of the DMRS bundling window to be ten slots, ten subframes (assuming 15 kHz SCS), one frame, or 10 ms. Thus, the UE may determine the DMRS bundling window to be ten slots (or ten subframes, one frame, 10 ms, etc.) based on the configuration, even though the UE may actually bundle DMRS in only four of the ten slots (the uplink slots).

The UE may indicate a capability of supported DMRS bundling window sizes. For instance, when the base station sends a UE capability inquiry message to the UE during initial access or some other time, the UE may report in a capability information message to the base station that the UE is capable of performing DMRS bundling (e.g., maintaining power consistency and phase continuity) in a specified number of slots, symbols, subframes, frames, or amount of time. The supported DMRS bundling window sizes (e.g., the specified number of slots, symbols, or amount of time) may include uplink and downlink slots, uplink and downlink symbols, or uplink and downlink transmission time. For example, the UE may inform the base station that the UE is capable of transmitting DMRS in different PUSCH transmissions within a DMRS bundling window of ten slots (including downlink slots) with the same MCS, with the same TDD or FDD duplexing scheme, in continuous time-domain resources, or with the same transmit power. Thus, the base station may expressly configure the DMRS bundling window in accordance with the UE's capability.

Figure 9:
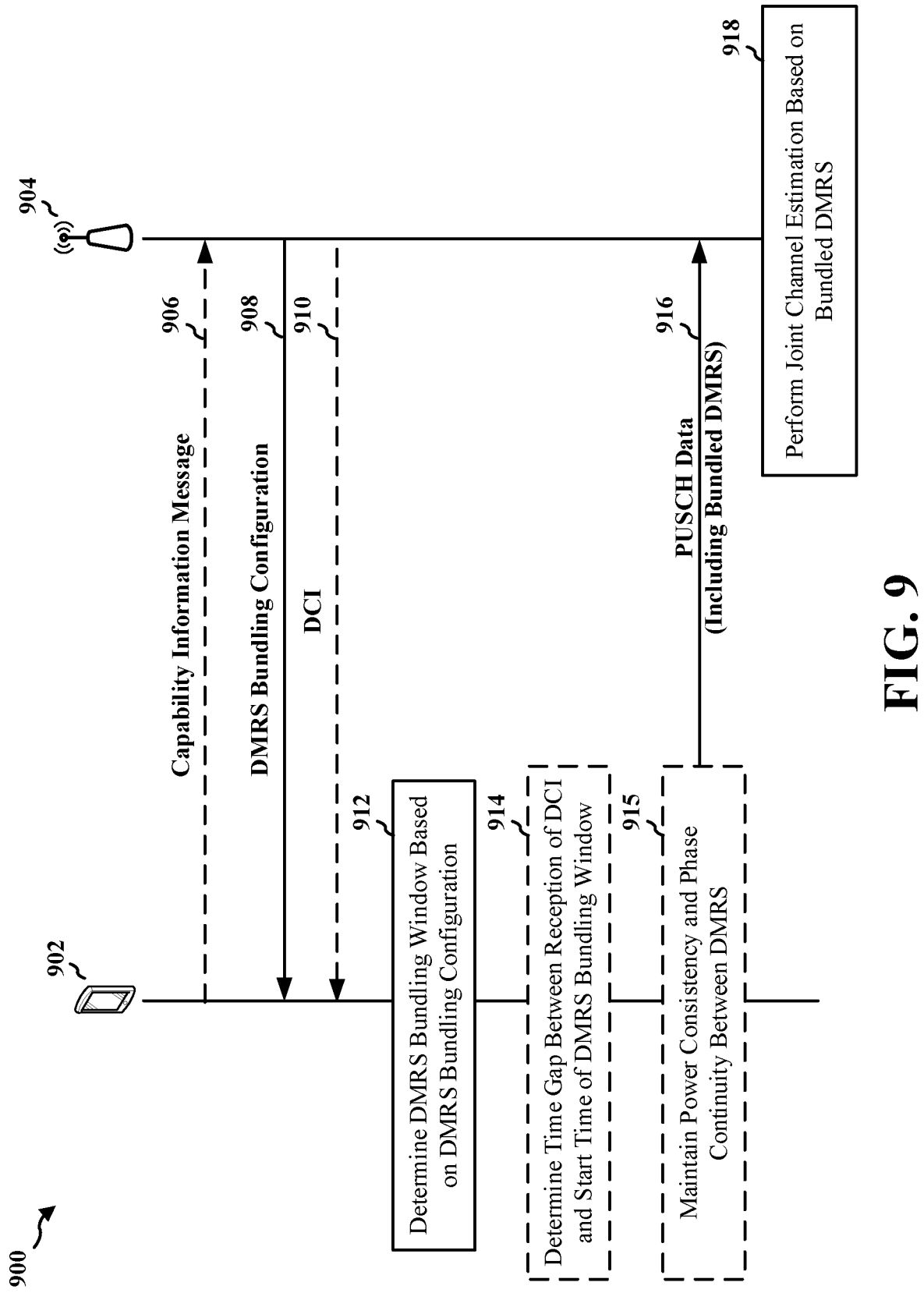
FIG. 9 is a call flow diagram between a UE and a base station.

FIG. 9 illustrates an example of a call flow 900 between a UE 902 and a base station 904. The UE may transmit a capability information message 906 to the base station. The capability information message may indicate a capability of supported DMRS bundling window sizes. The capability information message may include an additional time gap d, which the UE may apply between reception of DCI and transmission of uplink data on PUSCH, that determines the start time of the DMRS bundling window. The capability information message may be transmitted in response to a capability information inquiry from the base station (e.g., during initial access). For instance, referring to the fourth example described above and FIG. 8, the UE may report additional time gap 814 which the UE determines to apply for its PUSCH transmissions as a UE capability. For instance, the UE may report in a capability information message to the base station the additional time gap d that the UE has selected based on SCS 816, 818 and thus is capable of applying for DMRS bundling.

The base station 904 may provide a DMRS bundling configuration 908 to the UE 902. For instance, referring to the first example described above, the DMRS bundling configuration 908 may be a configuration indicating or enabling the UE to perform DMRS bundling for joint channel estimation across dynamically scheduled PUSCH transmissions carrying different transport blocks. The configuration may be provided within a PUSCH configuration (e.g., PUSCH-Config). Alternatively, the DMRS bundling configuration 908 may be separate from the PUSCH configuration. The DMRS bundling configuration 908 may also define the size or duration of the DMRS bundling window as a number of symbols including uplink and downlink symbols, a number of slots including uplink and downlink slots, a number of subframes, a number of frames, or an amount of time.

In another example, the DMRS bundling configuration 908 may be (or be included in) DCI 910. For instance, referring to the second example described above, the DCI 910 may indicate the DMRS bundling window, including a starting slot and an ending slot or duration, in which the DMRS of the DCI's scheduled PUSCH transmissions are to be bundled for joint channel estimation. For example, the DCI 910 (the DMRS bundling configuration in this example) may indicate a set of subsequent slots in which the UE is to transmit different uplink data with bundled DMRS, as described above with respect to FIG. 6. Alternatively, referring to the third example described above, the DCI 910 may be one of multiple DCIs provided to the UE each scheduling a different PUSCH transmission in a respective transport block. In such case, the DCIs may each include a NBI bit (the DMRS bundling configuration in this example) that the base station may configure to indicate the DMRS bundling window, as described above with respect to FIG. 7. Additionally, the DCI 910 scheduling one or more of the different PUSCH transmissions may include a specific DCI format indicating the DMRS in these different transport blocks are to be bundled. For instance, the DCI format indicating DMRS bundling may include NBI. Furthermore, a CRC may be attached to the DCI which is scrambled by a BI-RNTI of the UE.

After receiving the DMRS bundling configuration 908 and DCI 910 from base station 904, at 912, the UE 902 determines a DMRS bundling window based on the DMRS bundling configuration. For instance, referring to the first example described above, after the base station provides the DMRS bundling configuration indicating the UE to perform DMRS bundling across dynamically scheduled PUSCH transmissions carrying different transport blocks, the UE may determine the DMRS bundling window to encompass the dynamically scheduled PUSCH transmissions in one or more DCIs (e.g., DCI 910). In another example, referring to the second example described above and FIG. 6, the UE may determine the DMRS bundling window as corresponding to a set of subsequent slots indicated in DCI in which the UE is to transmit the different uplink data. For instance, referring to FIG. 6, the UE may determine DMRS bundling window 614 to encompass the first PUSCH transmission 606 and second PUSCH transmission 610 (slots n+k and n+k+1) scheduled by DCI 602. In a further example, referring to the third example described above and FIG. 7, the UE may determine the boundaries of a DMRS bundling window based on an NBI in multiple DCIs (including DCI 910). For example, referring to FIG. 7, the UE may determine a first one of the DMRS bundling windows 728 to correspond to the first PUSCH transmission 706 and second PUSCH transmission 710, and a second one of the DMRS bundling windows 728 to correspond to the third PUSCH transmission 714, the fourth PUSCH transmission 718, and the fifth PUSCH transmission 722. The UE may also determine the DMRS bundling window in response to decoding a BI-RNTI in a CRC attached to the DCI. In another example, referring to the fourth example described above and FIG. 8, the UE may determine the DMRS bundling window to start an additional number of symbols after the PUSCH preparation procedure time $T_{proc,2}$. Thus, the UE may determine the start time of the DMRS bundling window to correspond to an initial PUSCH transmission (e.g., transport block) scheduled to be transmitted $T_{proc,2}$+d symbols after reception of DCI, while the end time of the DMRS bundling window may correspond to a last PUSCH transmission (e.g., transport block) scheduled by DCI. For instance, the UE may determine a DMRS bundling window 810, which start time corresponds to the initial PUSCH transmission scheduled to occur after a PUSCH preparation time 812 ($T_{proc,2}$) and an additional time gap 814 ($d$). The UE maintains power consistency and phase continuity in DMRS of adjacent PUSCH transmissions when bundling DMRS within the DMRS bundling window. In contrast, for DMRS not within the DMRS bundling window, the UE does not actively seek to maintain power consistency and phase continuity between those DMRS, since those DMRS are not bundled.

At 914, the UE may determine a time gap between reception of DCI and a start time of the DMRS bundling window. The time gap (e.g., additional time gap d) may be an element of a set of durations (e.g., $d \in \{0,1,2\}$ symbols, or a set of some other numbers of symbols), which the UE may determine based on SCS. For example, similar to when calculating $T_{proc,2}$, the UE may determine the smaller SCS between the SCS associated with the DCI and the SCS associated with the PUSCH transmissions, and identify the additional time gap d as either 0, 1, or 2 symbols depending on the value of the smaller SCS. For instance, referring to the fourth example described above and with respect to FIG. 8, after the UE receives DCI 910, the UE may determine additional time gap 814 based on a smaller SCS between a SCS 816 associated with the DCI 808 and a SCS 818 associated with the slots 802 including the PUSCH transmissions.

After determining the DMRS bundling window at 912 and optionally the time gap at 914, the UE 902 may bundle the DMRS in the slots of the dynamically scheduled PUSCH transport blocks. For instance, at 915, the UE may maintain a power consistency and a phase continuity between the DMRS. For example, referring to FIGS. 6 and 7, the UE may bundle the DMRS 608, 612, 708, 712, 716, 720, 724 in the slots 604, 704 within the DMRS bundling window 614, 728 by transmitting the DMRS in each consecutive or adjacent slot with the same MCS, with the same TDD or FDD duplexing scheme, in continuous time-domain resources, or with the same transmit power in order to maintain power consistency and phase continuity between the DMRS. The UE 902 may transmit uplink data 916 on PUSCH in different transport blocks including the bundled DMRS.

Once the base station 904 receives the bundled DMRS, at 918, the base station may perform joint channel estimation based on the bundled DMRS. For example, referring to FIGS. 6 and 7, the base station may perform joint channel estimation (e.g., by identifying an average RSRP of the DMRS 608, 612, 708, 712, 716, 720, 724 in the slots 604, 704 within DMRS bundling window 614, 728).

FIG. 10 is a flowchart 1000 of a method of wireless communication. The method may be performed by a UE (e.g., the UE 104, 350, 902; the apparatus 1202). Optional aspects are illustrated in dashed lines. The method allows a UE to perform DMRS bundling in different transport blocks of uplink data on PUSCH in response to a configuration from a base station (e.g., the base station 102/180, 310, 904) indicating or enabling the UE to perform the DMRS bundling.

At 1002, the UE receives a configuration from a base station indicating to bundle DMRS in different uplink data channel transmission for joint channel estimation. For example, 1002 may be performed by configuration component 1240. For instance, referring to FIG. 9, the UE 902 may receive DMRS bundling configuration 908 from base station 904. In one example, referring to FIGS. 6-9, the DMRS bundling configuration 908 may be a configuration indicating or enabling the UE 902 to perform DMRS bundling for joint channel estimation across dynamically scheduled PUSCH transmissions carrying different transport blocks (e.g., PUSCH transmissions 606, 706, 806). The configuration may be received in a PUSCH configuration, and the different uplink data channel transmissions may be scheduled in DCI. For instance, referring to FIGS. 6-9, the DMRS bundling configuration 908 may be provided within a PUSCH configuration (e.g., PUSCH-Config), and the PUSCH transmissions (e.g., PUSCH transmissions 606, 706, 806) may be scheduled in one or more DCIs 910 (e.g., DCI 602, 702, 808). The configuration may indicate a duration of a DMRS bundling window as a number of symbols including uplink and downlink symbols, a number of slots including uplink and downlink slots, a number of subframes, a number of frames, or an amount of time. The configuration may also be received in response to a capability information message indicating a supported duration for the DMRS bundling window. For instance, when the base station sends a UE capability inquiry message to the UE during initial access or some other time, the UE may report in a capability information message to the base station that the UE is capable of performing DMRS bundling (maintaining power consistency and phase continuity) in a specified number of slots, symbols, subframes, frames, or amount of time, and the base station may expressly configure the DMRS bundling window in accordance with the UE's capability.

In another example, the configuration may comprise DCI indicating a DMRS bundling window. For instance, referring to FIGS. 6, 7, and 9, the DMRS bundling configuration 908 may be in the form of DCI 910, where in such example, DCI 910 (e.g., DCI 602, 702) indicates the DMRS bundling window (e.g., DMRS bundling window 614, 728). In one example, the DMRS bundling window may be indicated by a plurality of slots in which to bundle the DMRS. For instance, referring to FIGS. 6 and 9, the DCI 910 (e.g., DCI 602) may indicate the DMRS bundling window 614, including a starting slot (e.g., slot 604 including first PUSCH transmission 606) and an ending slot or duration (e.g., slot 604 including second PUSCH transmission 610), in which the DMRS 608, 612 of the DCI's scheduled PUSCH transmissions are to be bundled for joint channel estimation. In another example, the DCI may include a NBI, where the NBI indicates the DMRS bundling window. For instance, referring to FIGS. 7 and 9, the DCI 910 may be one of multiple DCIs (e.g., DCI 702) provided to the UE 902 each scheduling a different PUSCH transmission (e.g., PUSCH transmissions 706, 710, 714, 718, 722) in a respective transport block. In such case, the DCIs 702 may each include an NBI bit (e.g., NBI 726) that the base station may configure to indicate the DMRS bundling window 728. Additionally, the DCI may include a DCI format associated with a BI-RNTI. For instance, referring to FIGS. 7 and 9, the DCI 910 (e.g., DCI 702) scheduling one of the different PUSCH transmissions (e.g., PUSCH transmissions 706, 710, 714, 718, 722) may include a specific DCI format including NBI, and a CRC may be attached to the DCI which is scrambled by a BI-RNTI of the UE 902. The BI-RNTI may be UE-specific or group-specific.

At 1004, the UE determines a DMRS bundling window based on the configuration. For example, 1004 may be performed by bundling window component 1242. For instance, referring to FIG. 9, at 912, the UE 902 may determine a DMRS bundling window based on the DMRS bundling configuration 908 received from base station 904. As an example, the UE may determine the DMRS bundling window from the plurality of slots indicated in DCI in which the UE is to bundle the DMRS. For instance, referring to FIG. 6, the UE may determine DMRS bundling window 614 to encompass the first PUSCH transmission 606 and second PUSCH transmission 610 (slots n+k and n+k+1) scheduled by DCI 602.

In another example of 1004, at 1006, the UE may determine a start time of the DMRS bundling window in response to the NBI of a first DCI switching to a first value and an end time of the DMRS bundling window in response to the NBI of a second DCI switching to a second value different than the first value. For example, 1006 may be performed by bundling window component 1242. For instance, referring to FIGS. 7 and 9, the UE 902 may determine a start time 730 and stop time 732 of DMRS bundling window 728 based on the NBI 726 of each DCI 702. For instance, the UE may determine that the second one of the DMRS bundling windows 728, shown in FIG. 7, starts in response to toggling of the NBI 726 (from 0 to 1) in the DCIs 702 scheduling the second PUSCH transmission 710 and third PUSCH transmission 714, and ends in response to toggling again of the NBI (from 1 to 0) in a subsequent DCI after the DCI 702 scheduling the fifth PUSCH transmission 722. Thus, the UE may determine DMRS bundling window 728 to correspond to the third PUSCH transmission 714, the fourth PUSCH transmission 718, and the fifth PUSCH transmission 722.

At 1008, the UE may determine a time gap between reception of the DCI and a start time of the DMRS bundling window. For example, 1008 may be performed by time gap component 1244. For instance, referring to FIGS. 8 and 9, at 914, the UE 902 may determine a time gap (e.g., $T_{proc,2}+d$) between reception of DCI 808, 910 and a start time of the DMRS bundling window 810. The time gap may comprise a preparation time for the different uplink data channel transmissions (e.g. PUSCH preparation time 812 or $T_{proc,2}$), and an additional time gap (e.g. additional time gap 814 or d). The additional time gap may be based on a smallest SCS between a first SCS of the DCI and a second SCS of the different uplink data channel transmissions. For example, referring to FIGS. 8 and 9, after the UE 902 receives DCI 808, 910, the UE may determine additional time gap 814 based on a smaller SCS between a SCS 816 associated with the DCI 808, 910 and a SCS 818 associated with the slots 802 including the different PUSCH transmissions (e.g., the different transport blocks carried in PUSCH 806).

At 1010, the UE may report the additional time gap to the base station in a capability information message. For example, 1010 may be performed by capability information component 1246. For instance, referring to FIGS. 8 and 9, the UE 902 may transmit a capability information message 906 to the base station 904 including additional time gap 814 which the UE determines to apply for its PUSCH transmissions.

At 1009, the UE may maintain a power consistency between the bundled DMRS. For example, 1009 may be performed by bundled DMRS component 1248. Similarly, at 1011, the UE may maintain a phase continuity between the bundled DMRS. For example, 1011 may be performed by bundled DMRS component 1248. For instance, referring to FIG. 9, at 915, the UE 902 may maintain power consistency and phase continuity between the DMRS. The UE may maintain power consistency, for example, by applying a same transmit power to the DMRS in the DMRS bundling window, and the UE may maintain phase continuity, for example, by applying a same MCS, a same TDD or FDD scheme, or an allocation in continuous time-domain resources to the DMRS in the DMRS bundling window.

Finally, at 1012, the UE transmits the bundled DMRS in the DMRS bundling window. For example, 1012 may be performed by bundled DMRS component 1248. For instance, referring to FIGS. 6-9, the UE 902 may transmit uplink data 916 on PUSCH in different transport blocks (e.g., PUSCH transmissions 606, 610, 706, 710, 714, 718, 722, or the transmissions of data in PUSCH 806) including the bundled DMRS (e.g., DMRS 608, 612, 708, 712, 716, 720, 724, 804). Referring to FIGS. 6-8, the UE may maintain power consistency and phase continuity between the DMRS 608, 612, 708, 712, 716, 720, 724, 804 in the slots 604, 704, 802 within the DMRS bundling window 614, 728, 810 by transmitting the DMRS in each consecutive or adjacent slot with the same MCS, with the same TDD or FDD duplexing scheme, in continuous time-domain resources, or with the same transmit power.

Figure 11:
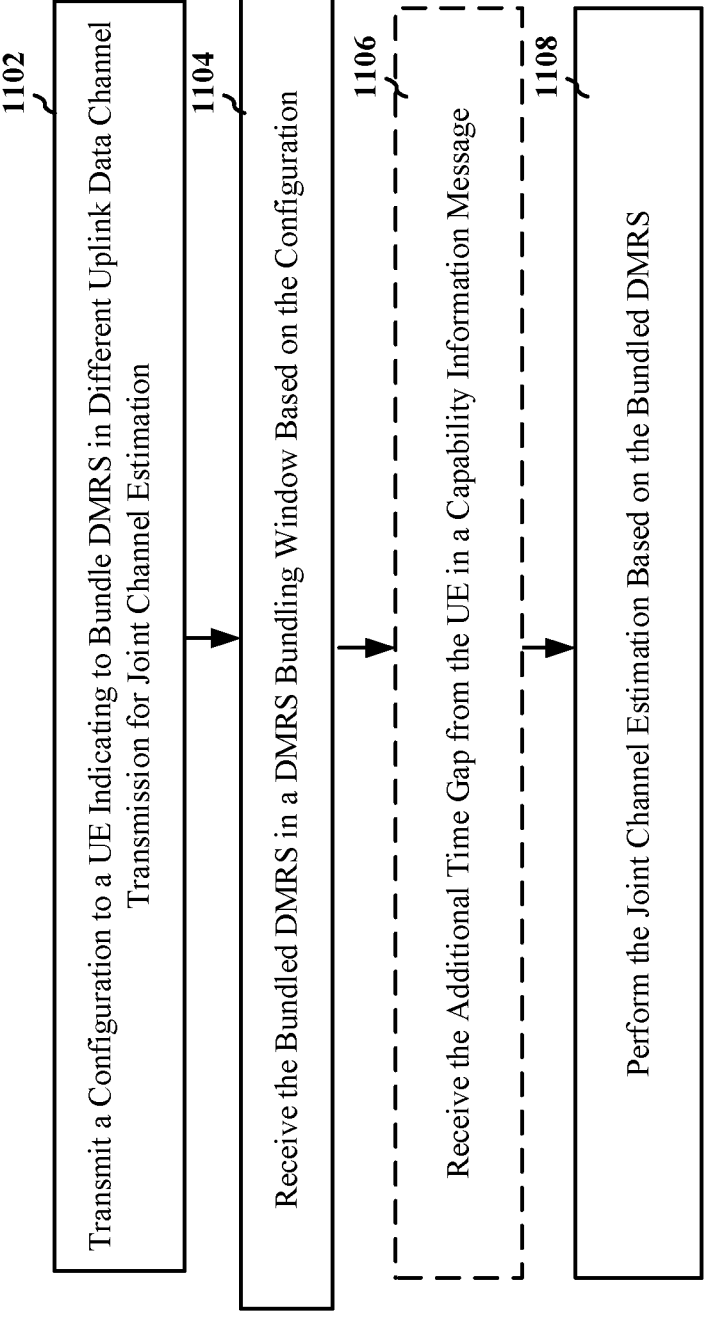
FIG. 11 is a flowchart of a method of wireless communication at a base station.

FIG. 11 is a flowchart 1100 of a method of wireless communication. The method may be performed by a base station (e.g., the base station 102/180, 310, 904; the apparatus 1302). Optional aspects are illustrated in dashed lines. The method allows a base station to configure a UE (e.g., the UE 104, 350, 902) to perform DMRS bundling in different transport blocks of uplink data on PUSCH to enable the base station to perform joint channel estimation.

At 1102, the base station transmits a configuration to a UE indicating to bundle DMRS in different uplink data channel transmission for joint channel estimation. For example, 1102 may be performed by configuration component 1340. For instance, referring to FIG. 9, the base station 904 may transmit DMRS bundling configuration 908 to UE 902. In one example, referring to FIGS. 6-9, the DMRS bundling configuration 908 may be a configuration indicating or enabling the UE 902 to perform DMRS bundling for joint channel estimation across dynamically scheduled PUSCH transmissions carrying different transport blocks (e.g., PUSCH transmissions 606, 706, 806). The configuration may be transmitted in a PUSCH configuration, and the different uplink data channel transmissions may be scheduled in DCI. For instance, referring to FIGS. 6-9, the DMRS bundling configuration 908 may be provided within a PUSCH configuration (e.g., PUSCH-Config), and the PUSCH transmissions (e.g., PUSCH transmissions 606, 706, 806) may be scheduled in one or more DCIs 910 (e.g., DCI 602, 702, 808). The configuration may indicate the duration of a DMRS bundling window as a number of symbols including uplink and downlink symbols, a number of slots including uplink and downlink slots, a number of subframes, a number of frames, or an amount of time. The configuration may be in response to a capability information message indicating a supported duration for the DMRS bundling window. For instance, when the base station sends a UE capability inquiry message to the UE during initial access or some other time, the UE may report in a capability information message to the base station that the UE is capable of performing DMRS bundling (maintaining power consistency and phase continuity) in a specified number of slots, symbols, subframes, frames, or amount of time, and the base station may expressly configure the DMRS bundling window in accordance with the UE's capability.

In another example, the configuration may comprise DCI indicating a DMRS bundling window. For instance, referring to FIGS. 6, 7, and 9, the DMRS bundling configuration 908 may be in the form of DCI 910, where in such example, DCI 910 (e.g., DCI 602, 702) indicates the DMRS bundling window (e.g., DMRS bundling window 614, 728). In one example, the DMRS bundling window may be indicated by a plurality of slots in which to bundle the DMRS. For instance, referring to FIGS. 6 and 9, the DCI 910 (e.g., DCI 602) may indicate the DMRS bundling window 614, including a starting slot (e.g., slot 604 including first PUSCH transmission 606) and an ending slot or duration (e.g., slot 604 including second PUSCH transmission 610), in which the DMRS 608, 612 of the DCI's scheduled PUSCH transmissions are to be bundled for joint channel estimation. In another example, the DCI may include a NBI, where the NBI indicates the DMRS bundling window. For instance, referring to FIGS. 7 and 9, the DCI 910 may be one of multiple DCIs (e.g., DCI 702) provided to the UE 902 each scheduling a different PUSCH transmission (e.g., PUSCH transmissions 706, 710, 714, 718, 722) in a respective transport block. In such case, the DCIs 702 may each include an NBI bit (e.g., NBI 726) that the base station may configure to indicate the DMRS bundling window 728. Additionally, the DCI may include a DCI format associated with a BI-RNTI. For instance, referring to FIGS. 7 and 9, the DCI 910 (e.g., DCI 702) scheduling one of the different PUSCH transmissions (e.g., PUSCH transmissions 706, 710, 714, 718, 722) may include a specific DCI format including NBI, and a CRC may be attached to the DCI which is scrambled by a BI-RNTI of the UE 902. The BI-RNTI may be UE-specific or group-specific.

At 1104, the base station receives the bundled DMRS in a DMRS bundling window based on the configuration. For example, 1104 may be performed by bundled DMRS component 1342. A power consistency may be maintained between the bundled DMRS. Similarly, a phase continuity may be maintained between the bundled DMRS. For example, the DMRS may have a same MCS, a same TDD or FDD scheme, or an allocation in continuous time-domain resources for phase continuity, or a same transmit power for power consistency. For instance, referring to FIGS. 6-9, in response to transmitting the DMRS bundling configuration 908 to the UE 902, the base station may receive uplink data 916 on PUSCH in different transport blocks (e.g., PUSCH transmissions 606, 610, 706, 710, 714, 718, 722, or the transmissions of data in PUSCH 806) including the bundled DMRS (e.g., DMRS 608, 612, 708, 712, 716, 720, 724, 804). Referring to FIGS. 6-8, the UE may maintain power consistency and phase continuity between the DMRS 608, 612, 708, 712, 716, 720, 724, 804 in the slots 604, 704, 802 within the DMRS bundling window 614, 728, 810 by transmitting the DMRS in each consecutive or adjacent slot with the same MCS, with the same TDD or FDD duplexing scheme, in continuous time-domain resources, or with the same transmit power.

In one example, the DMRS bundling window may be indicated in DCI by a plurality of slots in which the UE is to bundle the DMRS, as described above. For instance, referring to FIG. 6, the DMRS bundling window 614 may encompass the first PUSCH transmission 606 and second PUSCH transmission 610 (slots n+k and n+k+1) scheduled by DCI 602. In another example, the DCI may include a NBI, as described above. In such example, a start time of the DMRS bundling window may be in response to the NBI of a first DCI switching to a first value and an end time of the DMRS bundling window may be in response to the NBI of a second DCI switching to a second value different than the first value. For instance, referring to FIGS. 7 and 9, the start time 730 and stop time 732 of DMRS bundling window 728 may be based on the NBI 726 of each DCI 702. For instance, the second one of the DMRS bundling windows 728, shown in FIG. 7, starts in response to toggling of the NBI 726 (from 0 to 1) in the DCIs 702 scheduling the second PUSCH transmission 710 and third PUSCH transmission 714, and ends in response to toggling again of the NBI (from 1 to 0) in a subsequent DCI after the DCI 702 scheduling the fifth PUSCH transmission 722. Thus, the DMRS bundling window 728 may correspond to the third PUSCH transmission 714, the fourth PUSCH transmission 718, and the fifth PUSCH transmission 722.

In another example, the bundled DMRS may be received following a time gap between UE reception of the DCI and a start time of the DMRS bundling window. For instance, referring to FIGS. 8 and 9, at 914, the UE 902 may determine a time gap (e.g., $T_{proc,2}$+d) between reception of DCI 808, 910 and a start time of the DMRS bundling window 810. The time gap may comprise a preparation time for the different uplink data channel transmissions (e.g. PUSCH preparation time 812 or $T_{proc,2}$), and an additional time gap (e.g. additional time gap 814 or d). The additional time gap may be based on a smallest SCS between a first SCS of the DCI and a second SCS of the different uplink data channel transmissions. For example, referring to FIGS. 8 and 9, after the UE 902 receives DCI 808, 910, the UE may determine additional time gap 814 based on a smaller SCS between a SCS 816 associated with the DCI 808, 910 and a SCS 818 associated with the slots 802 including the different PUSCH transmissions (e.g., the different transport blocks carried in PUSCH 806).

At 1106, the base station may receive the additional time gap from the UE in a capability information message. For example, 1106 may be performed by additional time gap component 1344. For instance, referring to FIGS. 8 and 9, the UE 902 may transmit a capability information message 906 to the base station 904 including additional time gap 814 which the UE determines to apply for its PUSCH transmissions.

Finally, at 1108, the base station performs joint channel estimation based on the bundled DMRS. For example, 1108 may be performed by joint channel estimation component 1346. For instance, referring to FIG. 9, once the base station 904 receives the bundled DMRS, at 918, the base station may perform joint channel estimation based on the bundled DMRS. For example, referring to FIGS. 6-8, the base station may perform joint channel estimation by identifying an average RSRP of the DMRS 608, 612, 708, 712, 716, 720, 724, 804 in the slots 604, 704, 802 within DMRS bundling window 614, 728, 810, and determining a CQI associated with the channel based on the identified average RSRP.

Figure 12:
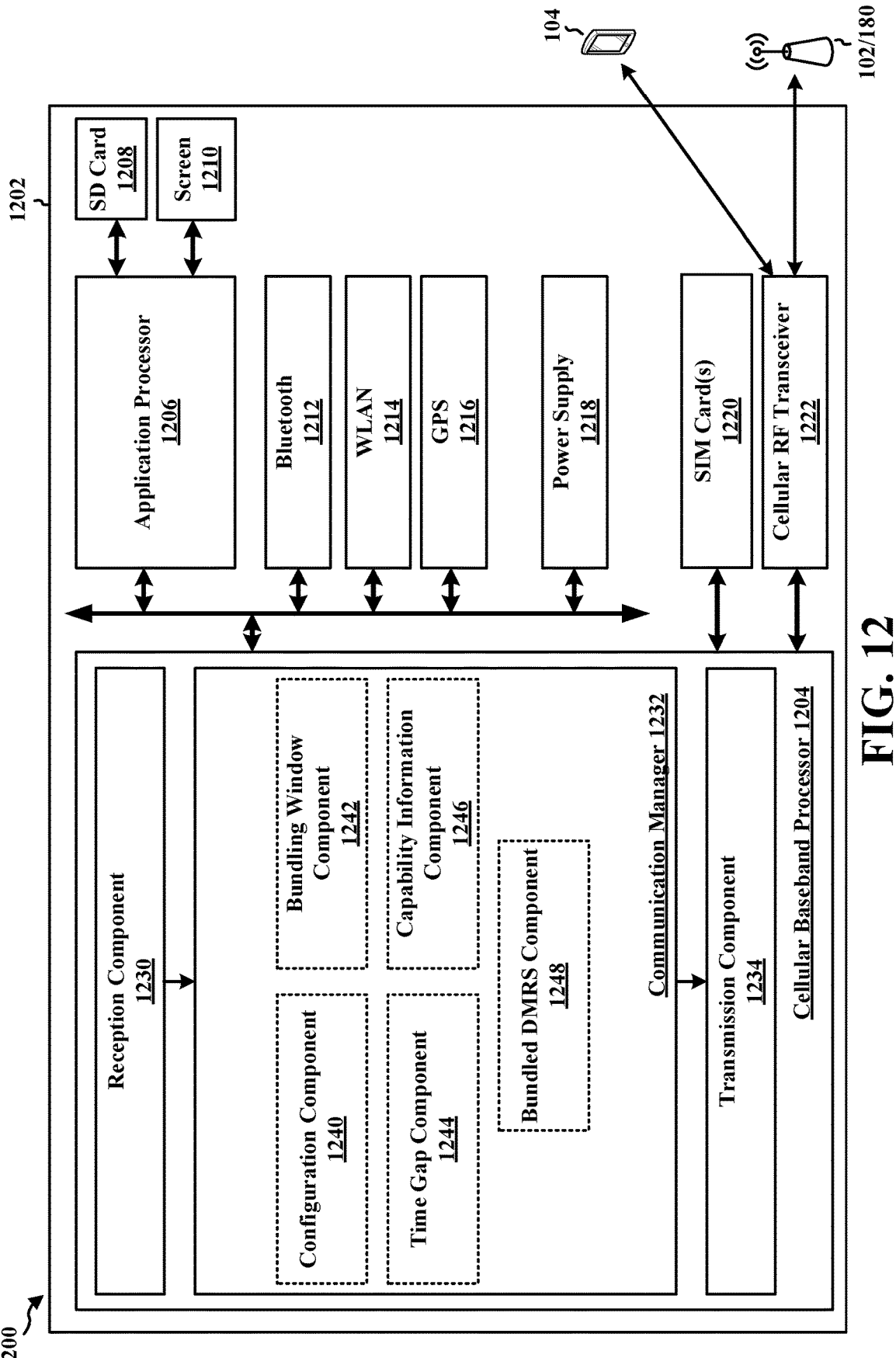
FIG. 12 is a diagram illustrating an example of a hardware implementation for an example apparatus, namely a UE.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a configuration component 1240 that is configured to receive a configuration from a base station indicating to bundle DMRS in different uplink data channel transmissions for joint channel estimation, e.g., as described in connection with 1002. The communication manager 1232 further includes a bundling window component 1242 that receives input in the form of the configuration from the configuration component 1240 and is configured to determine a DMRS bundling window based on the configuration, e.g., as described in connection with 1004. For example, the bundling window component may be configured to determine a start time of the DMRS bundling window when the NBI of a first DCI switches to a first value and an end time of the DMRS bundling window when the NBI of a second DCI switches to a second value different than the first value, e.g., as described in connection with 1006. The communication manager 1232 further includes a time gap component 1244 that receives input in the form of the configuration from the configuration component 1240 and is configured to determine a time gap between reception of DCI and a start time of the DMRS bundling window, where the time gap comprises a preparation time for the different uplink data channel transmissions and an additional time gap, e.g., as described in connection with 1008. The communication manager 1232 further includes a capability information component 1246 that receives input in the form of the time gap from the time gap component 1244 and is configured to report the additional time gap to the base station in a capability information message, e.g., as described in connection with 1010. The communication manager 1232 further includes a bundled DMRS component 1248 that receives input in the form of the DMRS bundling window from the bundling window component 1242 and is configured to transmit the bundled DMRS in the DMRS bundling window, e.g., as described in connection with 1012. The bundled DMRS component 1248 may further be configured to maintain a power consistency between the bundled DMRS, e.g., as described in connection with 1009, and to maintain a phase continuity between the bundled DMRS, e.g., as described in connection with 1011.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving a configuration from a base station indicating to bundle DMRS in different uplink data channel transmissions for joint channel estimation; means for determining a DMRS bundling window based on the configuration; and means for transmitting the bundled DMRS in the DMRS bundling window.

In one configuration, the means for determining may be further configured to determine a start time of the DMRS bundling window when the NBI of a first DCI switches to a first value and an end time of the DMRS bundling window when the NBI of a second DCI switches to a second value different than the first value.

In one configuration, the means for determining may be further configured to determine a time gap between reception of DCI and a start time of the DMRS bundling window, where the time gap comprises a preparation time for the different uplink data channel transmissions and an additional time gap.

In one configuration, the apparatus 1202, and in particular the cellular baseband processor 1204, may include means for reporting the additional time gap to the base station in a capability information message.

In one configuration, the apparatus 1202, and in particular the cellular baseband processor 1204, may include means for maintaining a power consistency between the bundled DMRS and means for maintaining a phase continuity between the bundled DMRS.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
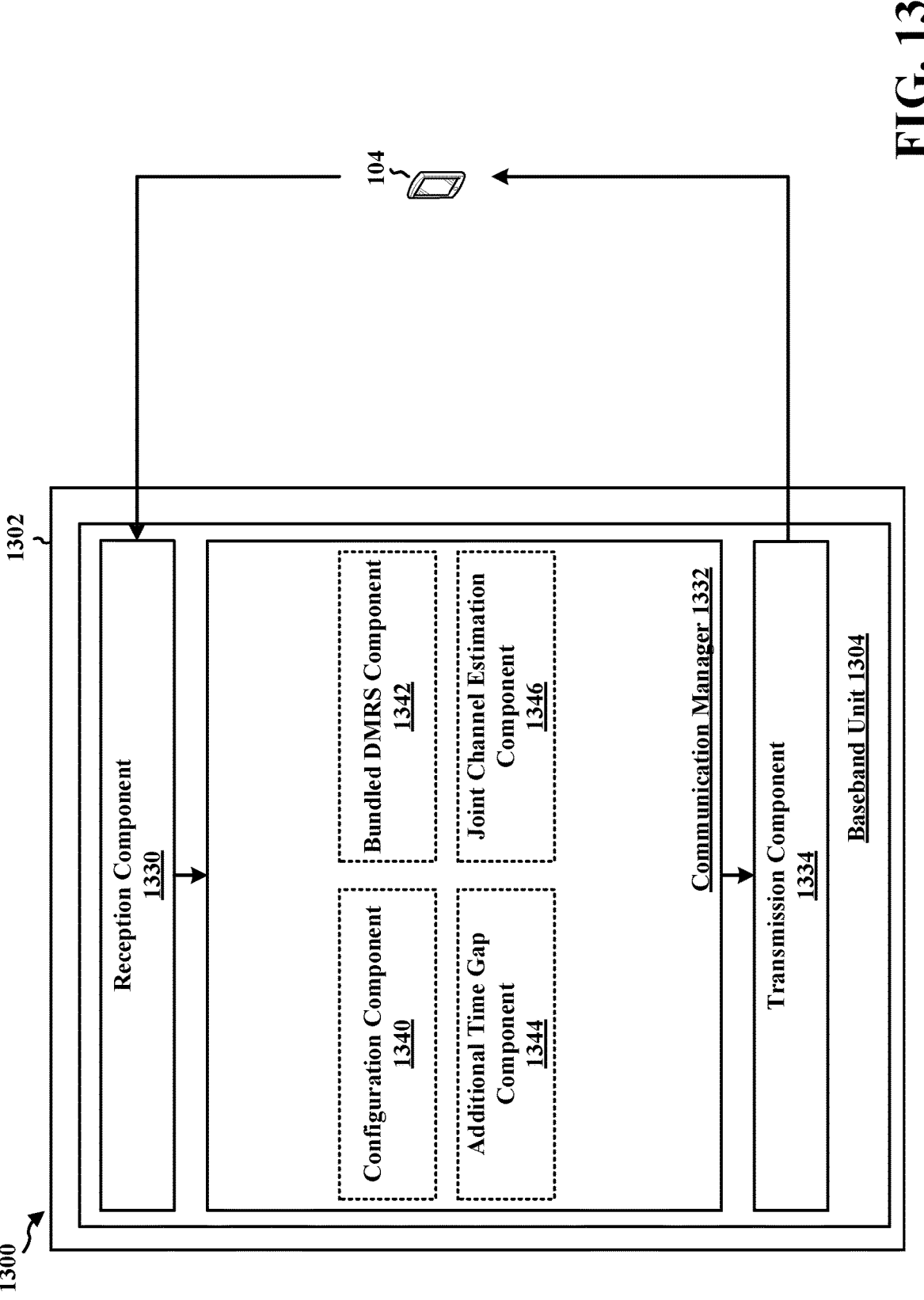
FIG. 13 is a diagram illustrating another example of a hardware implementation for another example apparatus, namely a base station.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a configuration component 1340 that is configured to transmit a configuration to a UE indicating to bundle DMRS in different uplink data channel transmissions for joint channel estimation, e.g., as described in connection with 1102. The communication manager 1332 further includes a bundled DMRS component 1342 that receives input in the form of the configuration from the configuration component 1340 and is configured to receive the bundled DMRS in a DMRS bundling window based on the configuration, e.g., as described in connection with 1104. The communication manager 1332 further includes an additional time gap component 1344 that is configured to receive an additional time gap from the UE in a capability information message, e.g., as described in connection with 1106. The communication manager 1332 further includes a joint channel estimation component 1346 that receives input in the form of the bundled DMRS from the bundled DMRS component 1342 and is configured to perform the joint channel estimation based on the bundled DMRS, e.g., as described in connection with 1108.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting a configuration to a UE indicating to bundle DMRS in different uplink data channel transmissions for joint channel estimation; means for receiving the bundled DMRS in a DMRS bundling window based on the configuration; and means for performing the joint channel estimation based on the bundled DMRS In one configuration, the means for receiving may further be configured to receive the additional time gap from the UE in a capability information message.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication at a user equipment (UE), comprising: receiving a configuration from a base station indicating to bundle demodulation reference signals (DMRS) in different uplink data channel transmissions for joint channel estimation; determining a DMRS bundling window based on the configuration; and transmitting the bundled DMRS in the DMRS bundling window.

Example 2 is the method of Example 1, wherein the configuration is received in a physical uplink shared channel (PUSCH) configuration, and wherein the different uplink data channel transmissions are scheduled in downlink control information (DCI).

Example 3 is the method of Example 1, wherein the configuration comprises downlink control information (DCI) indicating the DMRS bundling window.

Example 4 is the method of Example 3, wherein the DMRS bundling window is indicated in the DCI by a plurality of slots in which to bundle the DMRS.

Example 5 is the method of Example 3, wherein the DCI includes a DCI format associated with a bundling indication radio network temporary identifier (BI-RNTI).

Example 6 is the method of Example 5, wherein the BI-RNTI is UE-specific or group-specific.

Example 7 is the method of any of Examples 3, 5, or 6, wherein the DCI includes a new bundling indicator (NBI) and the determining of the DMRS bundling window comprises: determining a start time of the DMRS bundling window when the NBI of a first DCI switches to a first value and an end time of the DMRS bundling window when the NBI of a second DCI switches to a second value different than the first value.

Example 8 is the method of Example 1, further comprising: determining a time gap between reception of downlink control information (DCI) and a start time of the DMRS bundling window, wherein the time gap comprises a preparation time for the different uplink data channel transmissions and an additional time gap.

Example 9 is the method of Example 8, wherein the additional time gap is based on a smallest subcarrier spacing (SCS) between a first SCS of the DCI and a second SCS of the different uplink data channel transmissions.

Example 10 is the method of Example 8 or 9, further comprising: reporting the additional time gap to the base station in a capability information message.

Example 11 is an apparatus for wireless communication, comprising: a processor; memory coupled with the processor; and instructions stored in the memory and operable, when executed by the processor, to cause the apparatus to: receive a configuration from a base station indicating to bundle demodulation reference signals (DMRS) in different uplink data channel transmissions for joint channel estimation; determine a DMRS bundling window based on the configuration; and transmit the bundled DMRS in the DMRS bundling window.

Example 12 is the apparatus of Example 11, wherein the configuration is received in a physical uplink shared channel (PUSCH) configuration, and wherein the different uplink data channel transmissions are scheduled in downlink control information (DCI).

Example 13 is the apparatus of Example 11, wherein the configuration comprises downlink control information (DCI) indicating the DMRS bundling window.

Example 14 is the apparatus of Example 13, wherein the DMRS bundling window is indicated in the DCI by a plurality of slots in which to bundle the DMRS.

Example 15 is the apparatus of Example 13, wherein the DCI includes a DCI format associated with a bundling indication radio network temporary identifier (BI-RNTI).

Example 16 is the apparatus of Example 15, wherein the BI-RNTI is UE-specific or group-specific.

Example 17 is the apparatus of any of Examples 13, 15, or 16, wherein the DCI includes a new bundling indicator (NBI) and wherein the instructions, when executed by the processor, further cause the apparatus to: determine a start time of the DMRS bundling window when the NBI of a first DCI switches to a first value and an end time of the DMRS bundling window when the NBI of a second DCI switches to a second value different than the first value.

Example 18 is the apparatus of Example 11, wherein the instructions, when executed by the processor, further cause the apparatus to: determine a time gap between reception of downlink control information (DCI) and a start time of the DMRS bundling window, wherein the time gap comprises a preparation time for the different uplink data channel transmissions and an additional time gap.

Example 19 is the apparatus of Example 18, wherein the additional time gap is based on a smallest subcarrier spacing (SCS) between a first SCS of the DCI and a second SCS of the different uplink data channel transmissions.

Example 20 is the apparatus of Example 18 or 19, wherein the instructions, when executed by the processor, further cause the apparatus to: report the additional time gap to the base station in a capability information message.

Example 21 is an apparatus for wireless communication, comprising: means for receiving a configuration from a base station indicating to bundle demodulation reference signals (DMRS) in different uplink data channel transmissions for joint channel estimation; means for determining a DMRS bundling window based on the configuration; and means for transmitting the bundled DMRS in the DMRS bundling window.

Example 22 is the apparatus of Example 21, wherein the configuration is received in a physical uplink shared channel (PUSCH) configuration, and wherein the different uplink data channel transmissions are scheduled in downlink control information (DCI).

Example 23 is the apparatus of Example 21, wherein the configuration comprises downlink control information (DCI) indicating the DMRS bundling window.

Example 24 is the apparatus of Example 23, wherein the DMRS bundling window is indicated in the DCI by a plurality of slots in which to bundle the DMRS.

Example 25 is the apparatus of Example 23, wherein the DCI includes a DCI format associated with a bundling indication radio network temporary identifier (BI-RNTI).

Example 26 is the apparatus of Example 25, wherein the BI-RNTI is UE-specific or group-specific.

Example 27 is the apparatus of any of Examples 23, 25, or 26, wherein the DCI includes a new bundling indicator (NBI) and wherein the means for determining is further configured to determine a start time of the DMRS bundling window when the NBI of a first DCI switches to a first value and an end time of the DMRS bundling window when the NBI of a second DCI switches to a second value different than the first value.

Example 28 is the apparatus of Example 21, wherein the means for determining is further configured to determine a time gap between reception of downlink control information (DCI) and a start time of the DMRS bundling window, wherein the time gap comprises a preparation time for the different uplink data channel transmissions and an additional time gap.

Example 29 is the apparatus of Example 28, wherein the additional time gap is based on a smallest subcarrier spacing (SCS) between a first SCS of the DCI and a second SCS of the different uplink data channel transmissions.

Example 30 is the apparatus of Example 28 or 29, further comprising: means for reporting the additional time gap to the base station in a capability information message.

Example 31 is a computer-readable medium storing computer executable code, the code when executed by a processor cause the processor to: receive a configuration from a base station indicating to bundle demodulation reference signals (DMRS) in different uplink data channel transmissions for joint channel estimation; determine a DMRS bundling window based on the configuration; and transmit the bundled DMRS in the DMRS bundling window.

Example 32 is a method of wireless communication at a base station, comprising: transmitting a configuration to a user equipment (UE) indicating to bundle demodulation reference signals (DMRS) in different uplink data channel transmissions for joint channel estimation; receiving the bundled DMRS in a DMRS bundling window based on the configuration; and performing the joint channel estimation based on the bundled DMRS.

Example 33 is the method of Example 32, wherein the configuration is transmitted in a physical uplink shared channel (PUSCH) configuration, and wherein the different uplink data channel transmissions are scheduled in downlink control information (DCI).

Example 34 is the method of Example 32, wherein the configuration comprises downlink control information (DCI) indicating the DMRS bundling window.

Example 35 is the method of Example 34, wherein the DMRS bundling window is indicated in the DCI by a plurality of slots in which to bundle the DMRS.

Example 36 is the method of Example 34, wherein the DCI includes a DCI format associated with a bundling indication radio network temporary identifier (BI-RNTI).

Example 37 is the method of Example 36, wherein the BI-RNTI is UE-specific or group-specific.

Example 38 is the method of any of Examples 34, 36, or 37, wherein the DCI includes a new bundling indicator (NBI), a start time of the DMRS bundling window is when the NBI of a first DCI switches to a first value, and an end time of the DMRS bundling window is when the NBI of a second DCI switches to a second value different than the first value.

Example 39 is the method of Example 32, wherein the DMRS are received following a time gap between UE reception of downlink control information (DCI) and a start time of the DMRS bundling window, wherein the time gap comprises a preparation time for the different uplink data channel transmissions and an additional time gap.

Example 40 is the method of Example 39, wherein the additional time gap is based on a smallest subcarrier spacing (SCS) between a first SCS of the DCI and a second SCS of the different uplink data channel transmissions.

Example 41 is the method of Example 39 or 40, further comprising: receiving the additional time gap from the UE in a capability information message.

Example 42 is an apparatus for wireless communication, comprising: a processor; memory coupled with the processor; and instructions stored in the memory and operable, when executed by the processor, to cause the apparatus to: transmit a configuration to a user equipment (UE) indicating to bundle demodulation reference signals (DMRS) in different uplink data channel transmissions for joint channel estimation; receive the bundled DMRS in a DMRS bundling window based on the configuration; and perform the joint channel estimation based on the bundled DMRS.

Example 43 is the apparatus of Example 42, wherein the configuration is transmitted in a physical uplink shared channel (PUSCH) configuration, and wherein the different uplink data channel transmissions are scheduled in downlink control information (DCI).

Example 44 is the apparatus of Example 42, wherein the configuration comprises downlink control information (DCI) indicating the DMRS bundling window.

Example 45 is the apparatus of Example 44, wherein the DMRS bundling window is indicated in the DCI by a plurality of slots in which to bundle the DMRS.

Example 46 is the apparatus of Example 44, wherein the DCI includes a DCI format associated with a bundling indication radio network temporary identifier (BI-RNTI).

Example 47 is the apparatus of Example 46, wherein the BI-RNTI is UE-specific or group-specific.

Example 48 is the apparatus of any of Examples 44, 46, or 47, wherein the DCI includes a new bundling indicator (NBI), a start time of the DMRS bundling window is when the NBI of a first DCI switches to a first value, and an end time of the DMRS bundling window is when the NBI of a second DCI switches to a second value different than the first value.

Example 49 is the apparatus of Example 42, wherein the DMRS are received following a time gap between UE reception of downlink control information (DCI) and a start time of the DMRS bundling window, wherein the time gap comprises a preparation time for the different uplink data channel transmissions and an additional time gap.

Example 50 is the apparatus of Example 49, wherein the additional time gap is based on a smallest subcarrier spacing (SCS) between a first SCS of the DCI and a second SCS of the different uplink data channel transmissions.

Example 51 is the apparatus of Example 49 or 50, wherein the instructions, when executed by the processor, further cause the apparatus to: receive the additional time gap from the UE in a capability information message.

Example 52 is an apparatus for wireless communication, comprising: means for transmitting a configuration to a user equipment (UE) indicating to bundle demodulation reference signals (DMRS) in different uplink data channel transmissions for joint channel estimation; means for receiving the bundled DMRS in a DMRS bundling window based on the configuration; and means for performing the joint channel estimation based on the bundled DMRS.

Example 53 is the apparatus of Example 52, wherein the configuration is transmitted in a physical uplink shared channel (PUSCH) configuration, and wherein the different uplink data channel transmissions are scheduled in downlink control information (DCI).

Example 54 is the apparatus of Example 52 wherein the configuration comprises downlink control information (DCI) indicating the DMRS bundling window.

Example 55 is the apparatus of Example 54, wherein the DMRS bundling window is indicated in the DCI by a plurality of slots in which to bundle the DMRS.

Example 56 is the apparatus of Example 54, wherein the DCI includes a DCI format associated with a bundling indication radio network temporary identifier (BI-RNTI).

Example 57 is the apparatus of Example 56, wherein the BI-RNTI is UE-specific or group-specific.

Example 58 is the apparatus of any of Examples 54, 56, or 57, wherein the DCI includes a new bundling indicator (NBI), a start time of the DMRS bundling window is when the NBI of a first DCI switches to a first value, and an end time of the DMRS bundling window is when the NBI of a second DCI switches to a second value different than the first value.

Example 59 is the apparatus of Example 52, wherein the DMRS are received following a time gap between UE reception of downlink control information (DCI) and a start time of the DMRS bundling window, wherein the time gap comprises a preparation time for the different uplink data channel transmissions and an additional time gap.

Example 60 is the apparatus of Example 59, wherein the additional time gap is based on a smallest subcarrier spacing (SCS) between a first SCS of the DCI and a second SCS of the different uplink data channel transmissions.

Example 61 is the apparatus of Example 59 or 60, further comprising: means for reporting the additional time gap to the base station in a capability information message.

Example 62 is a computer-readable medium storing computer executable code, the code when executed by a processor cause the processor to: transmit a configuration to a user equipment (UE) indicating to bundle demodulation reference signals (DMRS) in different uplink data channel transmissions for joint channel estimation; receive the bundled DMRS in a DMRS bundling window based on the configuration; and perform the joint channel estimation based on the bundled DMRS.

Example 63 is the method of Examples 1 to 10, wherein the configuration indicates the duration of the DMRS bundling window as a number of symbols including uplink and downlink symbols, a number of slots including uplink and downlink slots, a number of subframes, a number of frames, or an amount of time.

Example 64 is the method of any of Examples 1 to 10 or 63, wherein the configuration is received in response to a capability information message indicating a supported duration for the DMRS bundling window.

Example 65 is the method of any of Examples 1 to 10, 63, or 64, further comprising maintaining a power consistency between the bundled DMRS and maintaining a phase continuity between the bundled DMRS, wherein the bundled DMRS comprises the DMRS having a same modulation and coding scheme (MCS), a same time division duplexing (TDD) or frequency division duplexing (FDD) scheme, an allocation in continuous time-domain resources, or a same transmit power.

Example 66 is the apparatus of Examples 11 to 20, wherein the configuration indicates the duration of the DMRS bundling window as a number of symbols including uplink and downlink symbols, a number of slots including uplink and downlink slots, a number of subframes, a number of frames, or an amount of time.

Example 67 is the apparatus of any of Examples 11 to 20 or 66, wherein the configuration is received in response to a capability information message indicating a supported duration for the DMRS bundling window.

Example 68 is the apparatus of any of Examples 11 to 20, 66, or 67, wherein the instructions, when executed by the processor, further cause the apparatus to maintain a power consistency between the bundled DMRS and maintain a phase continuity between the bundled DMRS, wherein the bundled DMRS comprises the DMRS having a same modulation and coding scheme (MCS), a same time division duplexing (TDD) or frequency division duplexing (FDD) scheme, an allocation in continuous time-domain resources, or a same transmit power.

Example 69 is the apparatus of Examples 21 to 30, wherein the configuration indicates the duration of the DMRS bundling window as a number of symbols including uplink and downlink symbols, a number of slots including uplink and downlink slots, a number of subframes, a number of frames, or an amount of time.

Example 70 is the apparatus of any of Examples 21 to 30 or 69, wherein the configuration is received in response to a capability information message indicating a supported duration for the DMRS bundling window.

Example 71 is the apparatus of any of Examples 21 to 30, 69, or 70, further comprising means for maintaining a power consistency between the bundled DMRS and for maintaining maintain a phase continuity between the bundled DMRS, wherein the bundled DMRS comprises the DMRS having a same modulation and coding scheme (MCS), a same time division duplexing (TDD) or frequency division duplexing (FDD) scheme, an allocation in continuous time-domain resources, or a same transmit power.

Example 72 is the method of Examples 32 to 41, wherein the configuration indicates the duration of the DMRS bundling window as a number of symbols including uplink and downlink symbols, a number of slots including uplink and downlink slots, a number of subframes, a number of frames, or an amount of time.

Example 73 is the method of any of Examples 32 to 41 or 72, wherein the configuration is received in response to a capability information message indicating a supported duration for the DMRS bundling window.

Example 74 is the method of any of Examples 32 to 41, 72, or 73, wherein a power consistency is maintained between the bundled DMRS and a phase continuity is maintained between the bundled DMRS, wherein the bundled DMRS comprises the DMRS having a same modulation and coding scheme (MCS), a same time division duplexing (TDD) or frequency division duplexing (FDD) scheme, an allocation in continuous time-domain resources, or a same transmit power.

Example 75 is the apparatus of Examples 42 to 51, wherein the configuration indicates the duration of the DMRS bundling window as a number of symbols including uplink and downlink symbols, a number of slots including uplink and downlink slots, a number of subframes, a number of frames, or an amount of time.

Example 76 is the apparatus of any of Examples 42 to 51 or 75, wherein the configuration is received in response to a capability information message indicating a supported duration for the DMRS bundling window.

Example 77 is the apparatus of any of Examples 42 to 51, 75 or 76, wherein a power consistency is maintained between the bundled DMRS and a phase continuity is maintained between the bundled DMRS, wherein the bundled DMRS comprises the DMRS having a same modulation and coding scheme (MCS), a same time division duplexing (TDD) or frequency division duplexing (FDD) scheme, an allocation in continuous time-domain resources, or a same transmit power.

Example 78 is the apparatus of Examples 52 to 61, wherein the configuration indicates the duration of the DMRS bundling window as a number of symbols including uplink and downlink symbols, a number of slots including uplink and downlink slots, a number of subframes, a number of frames, or an amount of time.

Example 79 is the apparatus of any of Examples 52 to 61 or 78, wherein the configuration is received in response to a capability information message indicating a supported duration for the DMRS bundling window.

Example 80 is the apparatus of any of Examples 52 to 61, 78, or 79, wherein a power consistency is maintained between the bundled DMRS and a phase continuity is maintained between the bundled DMRS, wherein the bundled DMRS comprises the DMRS having a same modulation and coding scheme (MCS), a same time division duplexing (TDD) or frequency division duplexing (FDD) scheme, an allocation in continuous time-domain resources, or a same transmit power.

What is claimed is:

1. A method of wireless communication at a user equipment (UE), comprising:
  receiving a configuration from a base station indicating to bundle demodulation reference signals (DMRS) in different uplink data channel transmissions for joint channel estimation;
  determining a DMRS bundling window based on the configuration;
  determining a time gap between reception of downlink control information (DCI) and a start time of the DMRS bundling window, wherein the time gap comprises a preparation time for the different uplink data channel transmissions and an additional time gap; and
  transmitting the bundled DMRS in the DMRS bundling window.

2. The method of claim 1, further comprising:
  maintaining a power consistency between the bundled DMRS; and
  maintaining a phase continuity between the bundled DMRS.

3. The method of claim 1, wherein the configuration is received in a physical uplink shared channel (PUSCH) configuration, and wherein the different uplink data channel transmissions are scheduled in the DCI.

4. The method of claim 1, wherein the configuration comprises the DCI indicating the DMRS bundling window.

5. The method of claim 4, wherein the DMRS bundling window is indicated in the DCI by a plurality of slots in which to bundle the DMRS.

6. The method of claim 4, wherein the DCI includes a DCI format associated with a bundling indication radio network temporary identifier (BI-RNTI).

7. The method of claim 6, wherein the BI-RNTI is UE-specific or group-specific.

8. The method of claim 4, wherein the DCI includes a new bundling indicator (NBI) and the determining of the DMRS bundling window comprises:
  determining a start time of the DMRS bundling window in response to the NBI of a first DCI switching to a first value and an end time of the DMRS bundling window in response to the NBI of a second DCI switching to a second value different than the first value.

9. The method of claim 1, wherein the additional time gap is based on a smallest subcarrier spacing (SCS) between a first SCS of the DCI and a second SCS of the different uplink data channel transmissions.

10. The method of claim 1, further comprising:
  reporting the additional time gap to the base station in a capability information message.

11. The method of claim 1, wherein the configuration indicates a duration of the DMRS bundling window as a number of symbols including uplink and downlink symbols, a number of slots including uplink and downlink slots, a number of subframes, a number of frames, or an amount of time.

12. The method of claim 1, wherein the configuration is received in response to a capability information message indicating a supported duration for the DMRS bundling window.

13. The method of claim 1, wherein the different uplink data channel transmissions comprise at least a first dynamically scheduled physical uplink shared channel (PUSCH) transmission comprising a first transport block and a second dynamically scheduled PUSCH transmission comprising a second transport block, the first transport block and the second transport block being different transport blocks.

14. An apparatus for wireless communication, comprising:

a processor;

memory coupled with the processor; and instructions stored in the memory and operable, when executed by the processor, to cause the apparatus to:

receive a configuration from a base station indicating to bundle demodulation reference signals (DMRS) in different uplink data channel transmissions for joint channel estimation;

determine a DMRS bundling window based on the configuration;

determine a time gap between reception of downlink control information (DCI) and a start time of the DMRS bundling window, wherein the time gap comprises a preparation time for the different uplink data channel transmissions and an additional time gap; and transmit the bundled DMRS in the DMRS bundling window.

15. The apparatus of claim 14, wherein the instructions, when executed by the processor, further cause the apparatus to:

maintain a power consistency between the bundled DMRS; and maintain a phase continuity between the bundled DMRS.

16. The apparatus of claim 14, wherein the different uplink data channel transmissions comprise at least a first dynamically scheduled physical uplink shared channel (PUSCH) transmission comprising a first transport block and a second dynamically scheduled PUSCH transmission comprising a second transport block, the first transport block and the second transport block being different transport blocks.

17. A method of wireless communication at a base station, comprising:

transmitting a configuration to a user equipment (UE) indicating to bundle demodulation reference signals (DMRS) in different uplink data channel transmissions for joint channel estimation;

receiving the bundled DMRS in a DMRS bundling window based on the configuration, wherein the DMRS are received following a time gap between UE reception of downlink control information (DCI) and a start time of the DMRS bundling window, wherein the time gap comprises a preparation time for the different uplink data channel transmissions and an additional time gap; and performing the joint channel estimation based on the bundled DMRS.

18. The method of claim 17, wherein a power consistency is maintained between the bundled DMRS and a phase continuity is maintained between the bundled DMRS.

19. The method of claim 17, wherein the configuration is transmitted in a physical uplink shared channel (PUSCH) configuration, and wherein the different uplink data channel transmissions are scheduled in the DCI.

20. The method of claim 17, wherein the configuration comprises the DCI indicating the DMRS bundling window.

21. The method of claim 20, wherein the DMRS bundling window is indicated in the DCI by a plurality of slots in which to bundle the DMRS.

22. The method of claim 20, wherein the DCI includes a DCI format associated with a bundling indication radio network temporary identifier (BI-RNTI).

23. The method of claim 22, wherein the BI-RNTI is UE-specific or group-specific.

24. The method of claim 20, wherein the DCI includes a new bundling indicator (NBI), a start time of the DMRS bundling window is in response to the NBI of a first DCI switching to a first value, and an end time of the DMRS bundling window is in response to the NBI of a second DCI switching to a second value different than the first value.

25. The method of claim 17, wherein the additional time gap is based on a smallest subcarrier spacing (SCS) between a first SCS of the DCI and a second SCS of the different uplink data channel transmissions.

26. The method of claim 17, further comprising:

receiving the additional time gap from the UE in a capability information message.

27. The method of claim 17, wherein the configuration indicates a duration of the DMRS bundling window as a number of symbols including uplink and downlink symbols, a number of slots including uplink and downlink slots, a number of subframes, a number of frames, or an amount of time.

28. The method of claim 17, wherein the configuration is transmitted in response to a capability information message indicating a supported duration for the DMRS bundling window.

29. An apparatus for wireless communication, comprising:

a processor;

memory coupled with the processor; and instructions stored in the memory and operable, when executed by the processor, to cause the apparatus to:

transmit a configuration to a user equipment (UE) indicating to bundle demodulation reference signals (DMRS) in different uplink data channel transmissions for joint channel estimation;

receive the bundled DMRS in a DMRS bundling window based on the configuration, wherein the DMRS are received following a time gap between UE reception of downlink control information (DCI) and a start time of the DMRS bundling window, wherein the time gap comprises a preparation time for the different uplink data channel transmissions and an additional time gap; and perform the joint channel estimation based on the bundled DMRS.

30. The apparatus of claim 29, wherein a power consistency is maintained between the bundled DMRS and a phase continuity is maintained between the bundled DMRS.

\* \* \* \* \*